United States Patent
Fritze et al.

[11] Patent Number: 6,124,231
[45] Date of Patent: Sep. 26, 2000

[54] SUPPORTED CATALYST SYSTEM, PROCESSES FOR ITS PREPARATION, AND ITS USE FOR THE POLYMERIZATION OF OLEFINS

[75] Inventors: Cornelia Fritze, Frankfurt; Frank Küber, Oberursel; Hans Bohnen, Niedernhausen, all of Germany

[73] Assignee: Targor GmbH, Germany

[21] Appl. No.: 08/909,546

[22] Filed: Aug. 12, 1997

[30] Foreign Application Priority Data

Aug. 13, 1996 [DE] Germany ............ 196 32 557
Aug. 28, 1996 [DE] Germany ............ 196 34 703

[51] Int. Cl.$^7$ ............ B01J 31/00; B01J 37/00; C08F 4/02; C08F 4/60
[52] U.S. Cl. ............ 502/152; 502/108; 502/118; 502/123; 502/155; 526/134
[58] Field of Search ............ 502/108, 118, 502/123, 155, 152; 526/134

[56] References Cited

U.S. PATENT DOCUMENTS

| | | | |
|---|---|---|---|
| 3,514,433 | 5/1970 | Nicco | 502/123 |
| 4,115,320 | 9/1978 | Meyborg | 502/155 |
| 4,677,088 | 6/1987 | Huff et al. | 502/108 |
| 5,347,024 | 9/1994 | Nickias et al. | 556/11 |
| 5,447,895 | 9/1995 | Marks et al. | 502/117 |
| 5,496,960 | 3/1996 | Piers et al. | 556/8 |
| 5,744,417 | 4/1998 | Nagy et al. | 502/155 |
| 6,031,145 | 2/2000 | Commereuc et al. | 502/152 |

FOREIGN PATENT DOCUMENTS

| | | |
|---|---|---|
| 710 663 | 10/1995 | European Pat. Off. . |
| 43-5754 | 3/1968 | Japan ............ 502/123 |
| 43-15827 | 7/1968 | Japan ............ 502/123 |
| 43-18907 | 8/1968 | Japan ............ 502/123 |
| 93/11172 | 6/1993 | WIPO . |
| 93/19103 | 9/1993 | WIPO . |
| 95/24268 | 9/1995 | WIPO . |
| 96/04319 | 2/1996 | WIPO . |
| 96/23005 | 8/1996 | WIPO . |
| 96/28480 | 9/1996 | WIPO . |
| 96/41808 | 12/1996 | WIPO . |
| 97/19959 | 6/1997 | WIPO . |

*Primary Examiner*—Mark L. Bell
*Assistant Examiner*—J. Pasterczyk
*Attorney, Agent, or Firm*—Connolly Bove Lodge & Hutz LLP

[57] ABSTRACT

The present invention relates to a supported composition, to processes for its preparation and to its use for polymerizing olefins. The supported catalyst composition comprises at least one transition metal compound of subgroup 3, 4 or 5 of the

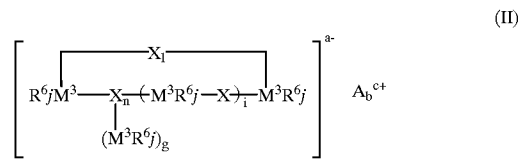

Periodic Table of the Elements and at least one cocatalyst having the formula II in which $R^6$ independently at each occurrence are a halogen atom or a $C_1$–$C_{40}$ carbon-containing group, X is independently at each occurrence a $C_1$–$C_{40}$ carbon containing group, $M^3$ independently at each occurrence is identical or different and is an element of group 13 of the Periodic Table of the Elements, a is an integer from 0 to 10, b is an integer from 0 to 10, c is an integer from 0 to 10 and a=b c, n is 0 or 1, m is 0 or 1, l is 0 or 1, g is an integer from 0 to 1, i is an integer from 0 to 1, j is an integer from 1 to 6, and A is a cation of group 1, 2 or 13 of the Periodic Table of the Elements, a carbonium, oxonium or sulfonium cation, or a quaternary ammonium cation.

13 Claims, No Drawings

SUPPORTED CATALYST SYSTEM, PROCESSES FOR ITS PREPARATION, AND ITS USE FOR THE POLYMERIZATION OF OLEFINS

The present invention relates to a supported catalyst system which can be employed advantageously in olefin polymerization and comprises at least one metallocene, a support and a cocatalyst which does not contain aluminoxane, and to a process for its preparation. The word "system" with respect to the phrase "catalyst system", which is referred to throughout the specification means catalyst composition.

Processes are known for preparing polyolefins with the aid of soluble homogeneous catalyst systems consisting of a transition metal component of the metallocene type and of a cocatalyst component of the aluminoxane type, of a Lewis acid or of an ionic compound. With high activity, these catalysts produce polymers and copolymers with a narrow molar mass distribution.

In polymerization processes with soluble homogeneous catalyst systems, severe deposits are formed on reactor walls and stirrers if the polymer is formed as a solid. These deposits always form by agglomeration of the polymer particles when metallocene and/or cocatalyst are present in solution within the suspension. Deposits of this kind in the reactor systems have to be removed at regular intervals, since they rapidly attain considerable thicknesses, are very strong and prevent heat exchange with the cooling medium. Furthermore, homogeneous catalyst systems cannot be used for preparing polyolefins in the gas phase.

To avoid the formation of deposits in the reactor, supported catalyst systems have been proposed in which the metallocene and/or the cocatalyst are bound on an inorganic support material.

EP-A-287 666 discloses a process for polymerizing olefins in the presence of a catalyst which consists of a compound of a transition metal, an inorganic support, an aluminoxane and an organoaluminum compound with a hydrocarbon group other than n-alkyl groups as solid catalyst component, the transition metal compound being represented by the formula

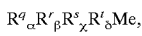

in which $R^q$ is a cycloalkadienyl group, $R^r$, $R^s$ and $R^t$ are identical or different and are each a cycloalkadienyl group, an aryl group, an alkyl group, an arylalkyl group, a halogen atom or a hydrogen atom, Me is zirconium, titanium or hafnium, $\alpha$ is 1, 2, 3 or 4, $\beta$, $\chi$ and $\delta$ are 0, 1, 2 or 3 and $\alpha+\beta+\chi+\delta=4$. With this process, polymers are obtained in good yield using a supported metallocene/aluminoxane system.

EP-A-336 593 discloses a process for preparing a supported metallocene/aluminoxane catalyst for olefin polymerization, in which aluminum trialkyl and water are reacted in the presence of a water-absorbing solid material with a molar ratio of aluminum, trialkyl to water of from 10:1 to 1:1 and in which a metallocene of a transition metal is added to the reacted mixture, the water being absorbed by the solid material prior to the reaction in an amount from 10 to 50% by weight, the water-containing solid material being added to a solution of aluminum trialkyl, and the molar ratio of aluminum to metallocene transition metal being from 1000:1 to 1:1. With this process the cocatalyst of the aluminoxane type is immobilized on the support and a polyolefin is obtained in good yields.

Hitherto the most effective cocatalysts, aluminoxanes have the disadvantage of being employed in a high excess.

However, aluminoxane-free cocatalysts are also known, which can be employed stoichiometrically and which convert the metallocene into a cationic compound. The role of cationic complexes in Ziegler-Natta polymerization with metallocenes has been generally recognized (M. Bochmann, Nachr. Chem. Lab. Techn. 1993, 41, 1220 ff).

Cationic alkyl complexes are synthesized by
a) protolysis of metallocene compounds with, for example, weakly acidic ammonium salts of the highly stable, nonbasic tetra(pentafluorophenyl)borate anion (e.g. $[PhMe_2NH]^+[B(C_6F_5)_4]^-$),
b) abstraction of an alkyl group from metallocene compounds with the aid of strong Lewis acids, possible Lewis acids including both salts of the form $(Ph_3C^+ BR_4^-)$ and strong neutral Lewis acids such as $B(C_6F_5)_3$, or
c) oxidation of metallocene dialkyl complexes with, for example, $AgBPh_4$ or $[Cp_2Fe][BPh_4]$.

EP-A-427 697 claims the synthesis of cationic metallocene catalysts by abstraction of alkyl from a metallocene alkyl compound using tris(pentafluorophenyi)borane. A process for preparing salts of the general form $LMX^+XA^-$ in accordance with the above-described principle is claimed in EP-A-520 732.

EP-A-558 158 claims zwitterionic catalyst systems which are prepared from metallocene dialkyl compounds and salts of the form $[R_3NH]^+[BPh_4]^-$. The reaction of such a salt with, say, $Cp^*_2ZrMe_2$ produces, by a protolysis with elimination of methane, a zirconocene methyl cation as intermediate. This intermediate reacts by C—H activation to form the zwitterion $Cp^*_2Zr^+$-$(m$-$C_6H_4)$-$BPh_3^-$.

In accordance with this reaction principle, following the protolysis of a metallocene dialkyl species with a perfluorinated $[R_3NH]^+[B(C_6F_5)_4]^-$ salt in the first step, a cationic species is likewise formed, the follow-on reaction (C—H activation) to zwitterionic complexes no longer being possible. Consequently, salts of the form $[Cp_2Zr$—$R$—$RH]^+[B (C_6F_5)_4]^-$ are formed. U.S. Pat. No. 5,348,299 claims corresponding systems in which dimethylanilinium salts with perfluorinated tetraphenylborate anions are used. The supporting of such systems is aimed at better morphology of the polymer and is described in WO 91/09882.

In DE 44 31 837 a supported metallocene catalyst system is claimed which is obtainable by applying a mixture comprising at least one metallocene complex and at least one metal compound to a support, which may have been pretreated, and then activating the system by reaction with a solution or suspension of a compound which forms metallocenium ions. These catalyst systems have the feature that they can be activated at any desired point in time.

EP-A-627 448 claims a supported ionic metallocene catalyst for polyolefin synthesis. This catalyst consists of a metallocene from subgroup 4 of the Periodic Table of the Elements and an ionic activator and is suitable for polymerizing olefins without aluminoxane as cocatalyst.

WO 95/14044 comprises a supported catalyst system comprising the components a) monocyclopentadienyl complex from subgroup 4 of the Periodic Table of the Elements, b) ionic activator and c) supported organometallic compound, it also being possible and optimal for a) and b) to be supported separately from c). This catalyst system is suitable for polymerizing olefins without an aluminoxane compound as cocatalyst.

The object of the present invention is to provide a supported catalyst system with which polymers are obtained with high activity and to provide an eco-friendly and economic process for preparing polymers which foregoes the use of a large excess of cocatalyst.

The object on which the present invention is based is achieved by a catalyst system which comprises at least one transition metal compound such as a metallocene, at least one support and at least one cocatalyst which contains no aluminoxane, the transition metal compound and cocatalyst not being covalently bonded to the support.

The catalyst system is prepared, in accordance with the invention, by mixing at least one transition metal compound such as a metallocene, at least one support and at least one cocatalyst.

In principle, any metallocene can be used as the metallocene component of the novel catalyst system. Preference is given to chiral metallocenes. In addition, further substituents, for example halogen, alkyl, alkenyl, alkoxy, aryl or alkylaryl groups, can be attached to the central metal atom. The central metal atom is preferably an element of subgroup III, IV, V or VI of the Periodic Table of the Elements, in particular from subgroup IV of the Periodic Table of the Elements, such as Ti, Zr or Hf. The term cyclopentadienyl ligand includes unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl, benzoindenyl, fluorenyl, benzofluorenyl, tetrahydrofluorenyl and octahydrofluorenyl radicals. The n ligands, for example cyclopentadienyl ligands, can be bridged or nonbridged, with single and multiple bridges—including those via ring systems—being possible. The term metallocene also embraces compounds having more than one metallocene fragment, known as polynuclear metallocenes. These can have any desired substitution pattern and bridging variants. The individual metallocene fragments of such polynuclear metallocenes can be either identical to or different from one another. Examples of such polynuclear metallocenes are described, for example, in EP-A-632 063, JP-A-04/80214, JP-A-04/85310, EP-A-654 476.

The term metallocene also includes monocyclopentadienyl systems such as bridged cyclopentadienylamido complexes.

Particular preference is given to nonbridged or bridged metallocenes of formula I

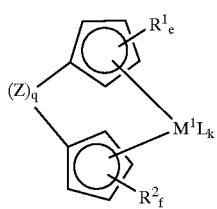

(I)

in which

M$^1$ is a metal of subgroup III, IV, V or VI of the Periodic Table of the Elements, especially Zr or Hf, R$^1$ is identical or different at each occurrence and is a hydrogen atom, SiR$_3^3$, in which each R$^3$ is identical or different and is a hydrogen atom or a C$_1$–C$_{40}$ carbon-containing group, such as C$_1$–C$_{20}$-alkyl, C$_1$–C$_{10}$-fluoroalkyl, C$_1$–C$_{10}$-alkoxy, C$_6$–C$_{20}$-aryl, C$_6$–C$_{10}$-fluoroaryl, C$_6$–C$_{10}$-aryloxy, C$_2$–C$_{10}$-alkenyl, C$_7$–C$_{40}$-arylalkyl, C$_7$–C$_{40}$-alkylaryl or C$_8$–C$_{40}$-arylalkenyl, or is a C$_1$–C$_{30}$ carbon-containing group, such as C$_1$–C$_{25}$-alkyl, for example methyl, ethyl, tert-butyl, cyclohexyl or octyl, C$_2$–C$_{25}$-alkenyl, C$_3$–C$_{15}$-alkylalkenyl, C$_6$–C$_{24}$-aryl, C$_5$–C$_{24}$-heteroaryl, such as pyridyl, furyl or quinolyl, C$_7$–C$_{30}$-arylalkyl, C$_7$–C$_{30}$-alkylaryl, fluorinated C$_1$–C$_{25}$-alkyl, fluorinated C$_6$–C$_{24}$-aryl, fluorinated C$_7$–C$_{30}$-arylalkyl, C$_7$–C$_{30}$-alkylaryl or C$_1$–C$_{12}$-alkoxy, or two or more radicals R$^1$ can be joined to one another such that the radicals R$^1$ and the atoms of the cyclopentadienyl ring which link them form a C$_4$–C$_{24}$ ring system which can in turn be substituted, R$^2$ is identical or different at each occurrence and is a hydrogen atom, SiR$_3^3$, in which each R$^3$ is identical or different and is a hydrogen atom or a C$_1$–C$_{40}$ carbon-containing group, such as C$_1$–C$_{20}$-alkyl, C$_1$–C$_{10}$-fluoroalkyl, C$_1$–C$_{10}$-alkoxy, C$_6$–C$_{14}$-aryl, C$_6$–C$_{10}$-fluoroaryl, C$_6$–C$_{10}$-aryloxy, C$_2$–C$_{10}$-alkenyl, C$_7$–C$_{40}$-arylalkyl, C$_7$–C$_{40}$-alkylaryl or C$_8$–C$_{40}$-arylalkenyl, or is a C$_1$–C$_{30}$ carbon-containing group, such as C$_1$–C$_{25}$-alkyl, for example methyl, ethyl, tert-butyl, cyclohexyl or octyl, C$_2$–C$_{25}$-alkenyl, C$_3$–C$_{15}$-alkylalkenyl, C$_6$–C$_{24}$-aryl, C$_5$–C$_{24}$-heteroaryl, for example pyridyl, furyl or quinolyl, C$_7$–C$_{30}$-arylalkyl, C$_7$–C$_{30}$-alkylaryl, fluorinated C$_1$–C$_{25}$-alkyl, fluorinated C$_6$–C$_{24}$-aryl, fluorinated C$_7$–C$_{30}$-arylalkyl, fluorinated C$_7$–C$_{30}$-alkylaryl or C$_1$–C$_{12}$-alkoxy, or two or more radicals R$^2$ can be joined to one another such that the radicals R$^2$ and the atoms of the cyclopentadienyl ring which link them form a C$_4$–C$_{24}$ ring system which can in turn be substituted, e is 5 if q=0, and n is 4 if q=1, f is 5 if q=0, and m is 4 if q=1, L is identical or different at each occurrence and is a halogen atom or a carbon-containing radical having 1–20 carbon atoms, for example C$_1$–C$_{20}$-alkyl, C$_2$–C$_{20}$-alkenyl, C$_1$–C$_{20}$-alkoxy, C$_6$–C$_{14}$-aryloxy or C$_6$–C$_{40}$-aryl, k is an integer from 1 to 4, and if M$^1$=Ti, Zr or Hf k is preferably 2, and Z is a bridging structural element between the two cyclopentadienyl rings, and q is 0 or 1.

Examples of Z are groups M$^2$R$^4$R$^5$, in which M$^2$ is carbon, silicon, germanium or tin and R$^4$ and R$^5$ are identical or different and are a C$_1$–C$_{20}$ carbon-containing group such as C$_1$–C$_{10}$-alkyl or a C$_6$–C$_{14}$-aryl group. Preferably, Z is CH$_2$, CH$_2$CH$_2$, CH(CH$_3$)CH$_2$, CH(C$_4$H$_9$)C(CH$_3$)$_2$, C(CH$_3$)$_2$, (CH$_3$)$_2$Si, (CH$_3$)$_2$Ge, (CH$_3$)$_2$Sn, (C$_6$H$_5$)$_2$Si, (C$_6$H$_5$)(CH$_3$)Si, (C$_6$H$_5$)$_2$Ge, (CH$_3$)$_5$SiSiCH$_3$, (C$_6$H$_5$)$_2$Sn, (CH$_2$)$_4$Si, CH$_2$Si(CH$_3$)$_2$, o-C$_6$H$_4$ or 2,2'-(C$_6$H$_4$)$_2$. Z can also form, together with one or more radicals R$^1$ and/or R$^2$, a monocyclic or polycyclic ring system.

Preference is given to chiral bridged metallocenes of the formula I, especially those in which q is 1 and one or both cyclopentadienyl rings are substituted such that they constitute an indenyl ring. The indenyl ring is preferably substituted, especially in position(s) 2, 4, 2,4,5, 2,4,6, 2,4,7 or 2,4,5,6, by C$_1$–C$_{20}$ carbon-containing groups, such as C$_1$–C$_{10}$-alkyl or C$_6$–C$_{20}$-aryl, it also being possible for two or more substituents of the indenyl ring together to form a ring system.

The following examples of metallocenes serve to illustrate the present invention but have no restrictive character:

Bis(cyclopentadienyl)zirconium dimethyl
Bis(indenyl)zirconium dimethyl
Bis(fluorenyl)zirconium dimethyl
(Indenyl)(fluorenyl)zirconium dimethyl
(3-Methyl-5-naphthylindenyl)(2,7-di-tert-butylfluorenyl) zirconium dimethyl
(3-Methyl-5-naphthylindenyl)(3,4,7-trimethoxyfluorenyl)zirconium dimethyl (Pentamethylcyclopentadienyl)(tetrahydroindenyl) zirconium dimethyl (Cyclopentadienyl)(1-octen-8-ylcyclopentadienyl) zirconium dimethyl (Indenyl)(1-buten4-ylcyclopentadienyl)zirconium dimethyl

[1,3-Bis(trimethylsilyl)cyclopentadienyl](3,4-benzofluorenyl)zirconium dimethyl

Bis(cyclopentadienyl)titanium dimethyl

Dimethylsilanediylbis(indenyl)zirconium dimethyl

Dimethylsilanediylbis(fluorenyl)zirconium dimethyl

Dimethylsilanediylbis(tetrahydroindenyl)zirconium dimethyl

Dimethylsilanediyl(cyclopentadienyl)(indenyl)zirconium dimethyl

Dimethylsilanediyl(cyclopentadienyl)(fluorenyl) zirconium dimethyl

Dimethylsilanediylbis(2-methylindenyl)zirconium dimethyl

Dimethylsilanediylbis(2-ethylindenyl)zirconium dimethyl

Dimethylsilanediylbis(2-methyl-4,5-benzoindenyl) zirconium dimethyl

Dimethylsilanediylbis(2-methyl-5,6-benzoindenyl) zirconium dimethyl

Dimethylsilanediylbis(2-ethyl-4,5-benzoindenyl) zirconium dimethyl

Dimethylsilanediylbis(4,5-dihydro-8-methyl-7H-cyclopent[e]acenaphthylen-7-ylidene)zirconium dimethyl Dimethylsilanediyl(2-methyl-4,5-benzoindenyl)(2-methyl-4-phenylindenyl)-zirconium dimethyl Dimethylsilanediyl(2-ethyl-4,5-benzoindenyl)(2-methyl-4-phenylindenyl)-zirconium dimethyl Dimethylsilanediyl(2-methyl-4,5-benzoindenyl)(2-ethyl-4-phenylindenyl)-zirconium dimethyl Dimethylsilanediyl(2-ethyl-4,5-benzoindenyl)(2-ethyl-4-naphthylindenyl)-zirconium dimethyl Dimethylsilanediyl(2-methylindenyl)(4-phenylindenyl) zirconium dimethyl Dimethylsilanediylbis(2-methyl-4-phenylindenyl) zirconium dimethyl Dimethylsilanediylbis(2-ethyl-4-phenylindenyl) zirconium dimethyl Dimethylsilanediylbis(2-methyl-4,6-diisopropylindenyl) zirconium dimethyl Dimethylsilanediylbis(2-ethyl-4,6-diisopropylindenyl) zirconium dimethyl Dimethylsilanediylbis(2-methyl-4-(1)-naphthyl)indenyl) zirconium dimethyl Dimethylsilanediylbis(2-methyl-4-(2)-naphthyl)indenyl) zirconium dimethyl Dimethylsilanediylbis(2-ethyl-4-(1)-naphthyl indenyl) zirconium dimethyl Dimethylsilanediylbis(2-ethyl-4-(2)-naphthylindenyl) zirconium dimethyl Dimethylsilanediylbis(2-trimethylsilyl indenyl)zirconium dimethyl Dimethylsilanediylbis(4-(1)-naphthylindenyl)zirconium dimethyl Dimethylsilanediylbis(2-methyl-4t-butylindenyl) zirconium dimethyl Dimethylsilanediylbis(2-methyl-4-isopropylindenyl) zirconium dimethyl Dimethylsilanediylbis(2-ethylindenyl)zirconium dimethyl Dimethylsilanediylbis(2,4-diethylindenyl)zirconium dimethyl Dimethylsilanediylbis(2,4-dimethylindenyl)zirconium dimethyl Dimethylsilanediylbis(2-methyl-5-fluorenylindenyl) zirconium dimethyl Dimethylsilanediylbis(2,4,6-trimethylindenyl)zirconium dimethyl Dimethylsilanediylbis(2,5,6-trimethylindenyl)zirconium dimethyl Dimethylsilanediylbis(2,4,7-trimethylindenyl)zirconium dimethyl Dimethylsilanediylbis(2-methyl-5-t-butylindenyl) zirconium dimethyl Diphenylsilanediylbis(indenyl)zirconium dimethyl Diphenylsilanediylbis(fluorenyl)zirconium dimethyl Diphenylsilanediylbis(tetrahydroindenyl)zirconium dimethyl Diphenylsilanediyl(cyclopentadienyl)(indenyl)zirconium dimethyl Diphenylsilanediyl(cyclopentadienyl)(fluorenyl) zirconium dimethyl Diphenylsilanediylbis(2-methylindenyl)zirconium dimethyl Diphenylsilanediylbis(2-methyl-4,5-benzoindenyl) zirconium dimethyl Diphenylsilanediylbis(2-ethyl-4,5-benzoindenyl) zirconium dimethyl Diphenylsilanediylbis(4,5-dihydro-8-methyl-7H-cyclopent[e]acenaphthylen-7-ylidene)zirconium dimethyl Diphenylsilanediyl(2-methyl-4,5-benzoindenyl)(2-ethyl-4-phenylindenyl)-zirconium dimethyl Diphenylsilanediyl(2-ethyl-4,5-benzoindenyl)(2-ethyl-4-naphthylindenyl)-zirconium dimethyl Diphenylsilanediyl(2-methylindenyl)(4-phenylindenyl) zirconium dimethyl Diphenylsilanediylbis(2-methyl-4-phenylindenyl) zirconium dimethyl Diphenylsilanediylbis(2-ethyl-4-phenylindenyl) zirconium dimethyl Diphenylsilanediylbis(2-methyl-4,6-diisopropylindenyl) zirconium dimethyl Diphenylsilanediylbis(2-ethyl-4,6-diisopropylindenyl) zirconium dimethyl Diphenylsilanediylbis(2-methyl-4-(1)-naphthyl)indenyl) zirconium dimethyl Diphenylsilanediylbis(2-ethyl-4-(1)-naphthylindenyl) zirconium dimethyl Diphenylsilanediylbis(2-trimethylsilylindenyl)zirconium dimethyl Diphenylsilanediylbis(4-(1)-naphthylindenyl)zirconium dimethyl Diphenylsilanediylbis(2-methyl-4-tbutylindenyl) zirconium dimethyl Diphenylsilanediylbis(2-ethylindenyl)zirconium dimethyl Diphenylsilanediylbis(2,4-dimethylindenyl)zirconium dimethyl
Diphenyisilanediylbis(2-methyl-5-fluorenylindenyl)zirconium dimethyl
Diphenylsilanediylbis(2,4,6-trimethylindenyl)zirconium dimethyl
Diphenylsilanediylbis(2-methyl-5-t-butylindenyl)zirconium dimethyl
Methylphenylsilanediylbis(indenyl)zirconium dimethyl
Methylphenylsilanediylbis(fluorenyl)zirconium dimethyl
Methylphenylsilanediylbis(tetrahydroindenyl)zirconium dimethyl
Methylphenylsilanediyl(cyclopentadienyl)(indenyl)zirconium dimethyl
Methylphenylsilanediyl(cyclopentadienyl)(fluorenyl)zirconium dimethyl
Methylphenylsilanediylbis(2-methylindenyl)zirconium dimethyl
Methylphenylsilanediylbis(2-methyl-4,5-benzoindenyl)zirconium dimethyl
Methylphenylsilanediylbis(2-ethyl-4,5-benzoindenyl)zirconium dimethyl
Methylphenylsilanediylbis(4,5-dihydro-8-methyl-7H-cyclopent[e]-acenaphthylen-7-ylidene)zirconium dimethyl
Methylphenylsilanediyl(2-methyl-4,5-benzoindenyl)(2-ethyl-4-phenylindenyl)zirconium dimethyl
Methylphenylsilanediyl(2-ethyl-4,5-benzoindenyl)(2-ethyl-4-naphthylindenyl)zirconium dimethyl
Methylphenylsilanediyl(2-methylindenyl)(4-phenylindenyl)zirconium dimethyl
Methylphenylsilanediylbis(2-methyl-4-phenylindenyl)zirconium dimethyl
Methylphenylsilanediylbis(2-ethyl-4-phenylindenyl)zirconium dimethyl
Methylphenylsilanediylbis(2-methyl-4,6-diisopropylindenyl)zirconium dimethyl
Methylphenylsilanediylbis(2-ethyl-4,6-diisopropylindenyl)zirconium dimethyl
Methylphenylsilanediylbis(2-methyl-4-(1)-naphthyl)indenyl)zirconium dimethyl
Methylphenylsilanediylbis(2-ethyl-4-(1)-naphthylindenyl)zirconium dimethyl
Methylphenylsilanediylbis(2-trimethylsilylindenyl)zirconium dimethyl
Methylphenylsilanediylbis(4-(1)-naphthylindenyl)zirconium dimethyl
Methylphenylsilanediylbis(2-methyl-4-t-butylindenyl)zirconium dimethyl
Methylphenylsilanediylbis(2-ethylindenyl)zirconium dimethyl
Methylphenylsilanediylbis(2,4-dimethylindenyl)zirconium dimethyl
Methylphenylsilanediylbis(2-methyl-5-fluorenylindenyl)zirconium dimethyl
Methylphenylsilanediylbis(2,4,6-trimethylindenyl)zirconium dimethyl
Methylphenylsilanediylbis(2-methyl-5-t-butylindenyl)zirconium dimethyl
Ethylene-1,2-bis(indenyl)zirconium dimethyl
Ethylene-1,2-bis(fluorenyl)zirconium dimethyl
Ethylene-1,2-bis(tetrahydroindenyl)zirconium dimethyl
Ethylene-1,2-(cyclopentadienyl)(indenyl)zirconium dimethyl
Ethylene-1,2-(cyclopentadienyl)(fluorenyl)zirconium dimethyl
Ethylene-1,2-bis(2-methylindenyl)zirconium dimethyl
Ethylene-1,2-bis(2-methyl-4,5-benzoindenyl)zirconium dimethyl
Ethylene-1,2-bis(2-ethyl-4,5-benzoindenyl)zirconium dimethyl
Ethylene-1,2-bis(4,5-dihydro-8-methyl-7H-cyclopent[e]acenaphthylen-7-ylidene)zirconium dimethyl
Ethylene-1,2-(2-methyl-4,5-benzoindenyl)(2-ethyl-4-phenylindenyl)-zirconium dimethyl
Ethylene-1,2-(2-ethyl-4,5-benzoindenyl)(2-ethyl-4-naphthylindenyl)-zirconium dimethyl
Ethylene-1,2-(2-methylindenyl)(4-phenylindenyl)zirconium dimethyl
Ethylene-1,2-bis(2-methyl-4-phenylindenyl)zirconium dimethyl
Ethylene-1,2-bis(2-ethyl-4-phenylindenyl)zirconium dimethyl
Ethylene-1,2-bis(2-methyl-4,6-diisopropylindenyl)zirconium dimethyl
Ethylene-1,2-bis(2-ethyl-4,6-diisopropylindenyl)zirconium dimethyl
Ethylene-1,2-bis(2-methyl-4-(1)-naphthyl)indenyl)zirconium dimethyl
Ethylene-1,2-bis(2-ethyl-4-(1)-naphthylindenyl)zirconium dimethyl
Ethylene-1,2-bis(2-trimethylsilylindenyl)zirconium dimethyl
Ethylene-1,2-bis(4-(1)-naphthylindenyl)zirconium dimethyl
Ethylene-1,2-bis(2-methyl-4-t-butylindenyl)zirconium dimethyl
Ethylene-1,2-bis(2-ethylindenyl)zirconium dimethyl
Ethylene-1,2-bis(2,4-dimethylindenyl)zirconium dimethyl
Ethylene-1,2-bis(2-methyl-5-fluorenylindenyl)zirconium dimethyl
Ethylene-1,2-bis(2,4,6-trimethylindenyl)zirconium dimethyl
Ethylene-1,2-bis(2-methyl-5-t-butylindenyl)zirconium dimethyl
1-Silacyclopentane-1,1-bis(indenyl)zirconium dimethyl
1-Silacyclopentane-1,1-bis(2-methylindenyl)zirconium dimethyl
1-Silacyclopentane-1,1-bis(2-ethylindenyl)zirconium dimethyl
1-Silacyclopentane-1,1-bis(2-methyl-4,5-benzoindenyl)zirconium dimethyl
1-Silacyclopentane-1,1-bis(2-ethyl-4,5-benzoindenyl)zirconium dimethyl
1-Silacyclopentane-1-(2-ethyl-4,5-benzoindenyl)-1-(2-methyl-4-phenylindenyl)zirconium dimethyl
1-Silacyclopentane-1,2-bis(2-methyl-4-phenylindenyl)zirconium dimethyl
1-Silacyclopentane-1,1-bis(2-ethyl-4-phenylindenyl)zirconium dimethyl
1-Silacyclopentane-1,1-bis(2-methyl-4,6-diisopropylindenyl)zirconium dimethyl 1-Silacyclopentane-1,1-bis(2-methyl-4-naphthylindenyl)
zirconiumdimethyl 1-Silacyclopentane-1,1-bis(2-ethyl-4-naphthylindenyl)
zirconium dimethyl Propylene-2,2-bis(indenyl)zirconium dimethyl Propylene-2-cyclopentadienyl-2-(1-indenyl)zirconium
dimethyl Propylene-2-cyclopentadienyl-2-(4-phenyl-1-indenyl)
zirconium dimethyl Propylene-2-cyclopentadienyl-2-(9-fluorenyl)zirconium
dimethyl Propylene-2-cyclopentadienyl-2-(2,7-dimethoxy-9-
fluorenyl)zirconium dimethyl Propylene-2-cyclopentadienyl-2-(2,7-di-tert-butyl-9-
fluorenyl)zirconium dimethyl Propylene-2-cyclopentadienyl-2-(2,7-dibromo-9-
fluorenyl)zirconium dimethyl Propylene-2-cyclopentadienyl-2-(2,7-diphenyl-9-
fluorenyl)zirconium dimethyl Propylene-2-cyclopentadienyl-2-(2,7-dimethyl-9-
fluorenyl)zirconium dimethyl Propylene-2-(3-methylcyclopentadienyl)-2-(2,7-dibutyl-
9-fluorenyl)-zirconium dimethyl Propylene-2-(3-tert-butylcyclopentadienyl)-2-(2,7-
dibutyl-9-fluorenyl)-zirconium dimethyl Propylene-2-(3-trimethylsilylcyclopentadienyl)-2-(3,6-
di-tert-butyl-9-fluorenyl)zirconium dimethyl Propylene-2-cyclopentadienyl-2-[2,7-bis(3-buten-1-yl)-
9-fluorenyl]-zirconium dimethyl Propylene-2-cyclopentadienyl-2-(3-tert-butyl-9-
fluorenyl)zirconium dimethyl Propylene-2,2-bis(tetrahydroindenyl)zirconium dimethyl Propylene-2,2-bis(2-methylindenyl)zirconium dimethyl Propylene-2,2-bis(2-ethylindenyl)zirconium dimethyl Propylene-2,2-bis(2-methyl-4,5-benzoindenyl)zirconium
dimethyl Propylene-2,2-bis(2-ethyl-4,5-benzoindenyl)zirconium
dimethyl Propylene-2,2-bis(4,5-dihydro-8-methyl-7H-cyclopent[e]
acenaphthylen-7-ylidene)zirconium dimethyl Propylene-2-(2-methyl-4,5-benzoindenyl)-2-(2-methyl-
4-phenylindenyl)-zirconium dimethyl Propylene-2-(2-methylindenyl)-2-(4-phenylindenyl)
zirconium dimethyl Propylene-2,2-bis(2-methyl-4-phenylindenyl)zirconium
dimethyl Propylene-2,2-bis(2-ethyl-4-phenylindenyl)zirconium
dimethyl Propylene-2,2-bis(2-methyl-4,6-diisopropylindenyl)
zirconium dimethyl Propylene-2,2-bis(2-methyl-4-naphthylindenyl)
zirconium dimethyl Propylene-2,2-bis(2-ethyl-4-naphthylindenyl)zirconium
dimethyl 1,6-Bis[methylsilylbis(2-methyl-4-phenylindenyl)
zirconium dimethyl]hexane 1,6-Bis[methylsilylbis(2-methyl-4,5-benzoindenyl)
zirconium dimethyl]hexane 1,6-Bis[methylsilylbis(2-ethyl-4-phenylindenyl)
zirconium dimethyl]hexane 1,6-Bis[methylsilylbis(2-methyl-4-naphthylindenyl)
zirconium dimethyl]hexane 1,6-Bis[methylsilylbis(2-methyl-4,6-diisopropylindenyl)
zirconium dimethyl]hexane 1,6-Bis[methylsilyl(2-methyl-4-phenylindenyl)(4,5-
benzoindenyl)zirconium dimethyl]hexane 1-[Methylsilylbis(tetrahydroindenyl)zirconium
dimethyl]-6-[ethylstannyl-(cyclopentadienyl)-
(fluorenyl)zirconium dimethyl]hexane 1,6-Disila-1,1,6,6-tetramethyl-1,6-bis[methylsilylbis(2-
methyl-4-phenylindenyl)zirconium dimethyl]hexane 1,4-Disila-1,4-bis[methylsilylbis(2-methyl-4-
phenylindenyl)zirconium dimethyl]cyclohexane

[1,4-Bis(1-indenyl)-1,1,4,4-tetramethyl-1,4-disilabutane]
bis(pentamethylcyclopentadienylzirconium dimethyl)

[1,4-Bis(9-fluorenyl)-1,1,4,4-tetramethyl-1,4-
disilabutane]bis(cyclopentadienylzirconium dimethyl)

[(1,4-Bis(1-indenyl)-1,1,4,4-tetramethyl-1,4-
disilabutane]bis(cyclopentadienylzirconium dimethyl)

[1-(1-indenyl)-6-(2-phenyl-1-indenyl)-1,1,6,6-tetraethyl-
1,6-disila-4-oxa-hexane]bis(tert-
butylcyclopentadienylzirconium dimethyl)

[1,10-Bis(2,3-dimethyl-1-indenyl)-1,110,10-tetramethyl-
1,10-digermadecane]bis(2-methyl-4-
phenylindenylzirconium dimethyl)

(1-Methyl-3-tert-butylcyclopentadienyl)(1-phenyl-4-
methoxy-7-chlorofluorenyl)zirconium dimethyl (4,7-Dichloroindenyl)(3,6-dimesitylfluorenyl)zirconium
dimethyl Bis(2,7-di-tert-butyl-9-cyclohexylfluorenyl)zirconium
dimethyl (2,7-Dimesitylfluorenyl)[2,7-bis(1-naphthyl)fluorenyl]
zirconium dimethyl Dimethylsilylbis(fluorenyl)zirconium dimethyl Dibutylstannylbis(2-methylfluorenyl)zirconium dimethyl 1,1,2,2-Tetraethyldisilanediyl(2-methylindenyl)(4-
phenylfluorenyl)zirconium dimethyl Propylene-1-(2-
indenyl)-2-(9-fluorenyl)zirconium dimethyl 1,1-Dimethyl-1-silaethylenebis(fluorenyl)zirconium dimethyl

[4-(Cyclopentadienyl)-4,7,7-trimethyl
(tetrahydroindenyl)]zirconium dimethyl

[4-(Cyclopentadienyl)-4,7-dimethyl-7-phenyl(5,6-
dimethyltetrahydroindenyl)]zirconium dimethyl

[4-(Cyclopentadienyl)-4,7-dimethyl-7-(1-naphthyl)(7-
phenyltetrahydroindenyl)]zirconium dimethyl

[4-(Cyclopentadienyl)-4,7-dimethyl-7-butyl(6,6-
diethyltetrahydroindenyl)]-zirconium dimethyl

[4-(3-tert-Butylcyclopentadienyl)-4,7,7-trimethyl
(tetrahydroindenyl)]-zirconium dimethyl

[4-(1-Indenyl)-4,7,7-trimethyl(tetrahydroindenyl)]
zirconium dimethyl

Bis(cyclopentadienyl)titanium dimethyl

Bis(cyclopentadienyl)hafnium dimethyl

Bis(indenyl)vanadium dimethyl

Bis(fluorenyl)scandium dimethyl (Indenyl)(fluorenyl)niobium dimethyl (2-Methyl-7-naphthylindenyl)(2,6-di-tert-butylfluorenyl)
titanium dimethyl (Pentamethylcyclopentadienyl)(tetrahydroindenyl)
hafnium bromide methyl (Cyclopentadienyl)(1-octen-8-ylcyclopentadienyl)
hafnium dimethyl (Indenyl)(2-buten-4-ylcyclopentadienyl)titanium dimethyl

[1,3-Bis(trimethylsilyl)cyclopentadienyl](3,4-benzofluorenyl)niobium dimethyl

Dimethylsilanediylbis(indenyl)titanium dimethyl

Dimethylsilanediylbis(tetrahydroindenyl)hafnium dimethyl

Dimethylsilanediyl(cyclopentadienyl)(indenyl)titanium dimethyl

Dimethylsilanediylbis(2-methylindenyl)hafnium dimethyl

Dimethylsilanediylbis(2-ethylindenyl)scandium methyl

Dimethylsilanediylbis(2-butyl-4,5-benzoindenyl)niobium dimethyl

Dimethylsilanediylbis(2-ethyl-4,5-benzoindenyl)titanium dimethyl

Dimethylsilanediylbis(4,5-dihydro-8-methyl-7H-cyclopent[e]acenaphthylen-7-ylidene)titanium dimethyl Dimethylsilanediyl(2-methyl-4,5-benzoindenyl)(2-methyl-4-phenylindenyl)titanium dimethyl Dimethylsilanediyl(2-ethyl-4,5-benzoindenyl)(2-methyl-4-phenylindenyl)hafnium dimethyl Dimethylsilanediyl(2-methyl-4,5-benzoindenyl)(2-ethyl-4-phenylindenyl)scandium methyl Dimethylsilanediyl(2-ethyl-4,5-benzoindenyl)(2-ethyl-4-naphthylindenyl)titanium dimethyl Dimethylsilanediyl(2-methylindenyl)(4-phenylindenyl)hafnium dimethyl Dimethylsilanediylbis(2-methyl-4-phenylindenyl)niobium dimethyl Dimethylsilanediylbis(2-ethyl-4-phenylindenyl)vanadium dimethyl Dimethylsilanediylbis(2-methyl-4,6-diisopropylindenyl)hafnium dimethyl Dimethylsilanediylbis(2-ethyl-4,6-diisopropylindenyl)vanadium dimethyl Dimethylsilanediylbis(2-methyl-4-naphthylindenyl)hafnium bromide methyl Dimethylsilanediylbis(2-ethyl-4-naphthylindenyl)titanium dimethyl Methylphenylsilanediylbis(indenyl)titanium dimethyl Methylphenylsilanediyl(cyclopentadienyl)(indenyl)hafnium dimethyl Methylphenylsilanediylbis(tetrahydroindenyl)hafnium dimethyl Methylphenylsilanediylbis(2-methylindenyl)titanium dimethyl Methylphenylsilanediylbis(2-ethylindenyl)hafnium dimethyl Methylphenylsilanediylbis(2-methyl-4,5-benzoindenyl)hafnium dimethyl Methylphenylsilanediylbis(2-ethyl-4,5-benzoindenyl)vanadium dimethyl Methylphenylsilanediylbis(4,5-dihydro-8-methyl-7H-cyclopent[e]ace-naphthylen-7-ylidene)titanium dimethyl Methylphenylsilanediylbis(2-methyl-4,5-benzoindenyl)(2-methyl-4-phenylindenyl)titanium bromide methyl Methylphenylsilanediyl(2-ethyl-4,5-benzoindenyl)(2-methyl-4-phenylindenyl)titanium dimethyl Methylphenylsilanediyl(2-methyl-4,5-benzoindenyl)(2-ethyl-4-phenylindenyl)hafnium dimethyl Methylphenylsilanediyl(2-ethyl-4,5-benzoindenyl)(2-ethyl-4-naphthylindenyl)hafnium dimethyl Methylphenylsilanediyl(2-methylindenyl)(4-phenylindenyl)titanium dimethyl Methylphenylsilanediylbis(2-methyl-4-phenylindenyl)hafnium dimethyl Methylphenylsilanediylbis(2-ethyl-4-phenylindenyl)vanadium dimethyl Methylphenylsilanediylbis(2-methyl-4,6-diisopropylindenyl)titanium dimethyl Methylphenylsilanediylbis(2-ethyl-4,6-diisopropylindenyl)hafnium dimethyl Methylphenylsilanediylbis(2-methyl-4-naphthylindenyl)hafnium dimethyl Methylphenylsilanediylbis(2-ethyl-4-naphthylindenyl)titanium dimethyl Diphenylsilanediylbis(indenyl)titanium dimethyl Diphenylsilanediylbis(2-methylindenyl)hafnium dimethyl Diphenylsilanediylbis(2-ethylindenyl)titanium dimethyl Diphenylsilanediyl(cyclopentadienyl)(indenyl)hafnium dimethyl Diphenylsilanediylbis(2-methyl-4,5-benzoindenyl)titanium dimethyl Diphenylsilanediylbis(2-ethyl-4,5-benzoindenyl)hafnium dimethyl Diphenylsilanediyl(2-methyl-4,5-benzoindenyl)(2-methyl-4-phenylindenyl)-hafnium dimethyl Diphenylsilanediyl(2-ethyl-4,5-benzoindenyl)(2-methyl-4-phenylindenyl)-titanium dimethyl Diphenylsilanediyl(2-methyl-4,5-benzoindenyl)(2-ethyl-4-phenylindenyl)-hafnium dimethyl Diphenylsilanediyl(2-ethyl-4,5-benzoindenyl)(2-ethyl-4-naphthylindenyl)-titanium dimethyl Diphenylsilanediyl(2-methylindenyl)(4-phenylindenyl)titanium dimethyl Diphenylsilanediylbis(2-methyl-4-phenylindenyl)titanium dimethyl Diphenylsilanediylbis(2-ethyl-4-phenyl indenyl)hafnium dimethyl Diphenylsilanediylbis(2-methyl-4,6-diisopropylindenyl)hafniumdimethyl Diphenylsilanediylbis(2-ethyl-4,6-diisopropylindenyl)hafnium dimethyl Diphenylsilanediylbis(2-methyl-4-naphthylindenyl)hafnium dimethyl Diphenylsilanediylbis(2-ethyl-4-naphthylindenyl)titanium dimethyl 1-Silacyclopentane-1,1-bis(indenyl)hafnium dimethyl 1-Silacyclopentane-1,1-bis(2-methylindenyl)hafnium dimethyl 1-Silacyclopentane-1,1-bis(2-ethylindenyl)hafnium dimethyl 1-Silacyclopentane-1,1-bis(2-methyl-4, 5-benzoindenyl)titanium dimethyl 1-Silacyclopentane-1,1-bis(2-ethyl-4,5-benzoindenyl)hafnium dimethyl 1-Silacyclopentane-1-(2-methyl-4,5-benzoindenyl)-1-(2-methyl-4-phenylindenyl)scandium methyl 1-Silacyclopentane-1-(2-ethyl-4,5-benzoindenyl)-1-(2-methyl-4-phenylindenyl)hafnium dimethyl 1-Silacyclopentane-1-(2-methyl-4,5-benzoindenyl)-1-(2-ethyl-4-phenylindenyl)titanium dimethyl 1-Silacyclopentane-1-(2-ethyl-4,5-benzoindenyl)-1-(2-ethyl-4-naphthylindenyl)hafnium dimethyl 1-Silacyclopentane-1-(2-methylindenyl)-1-(4-phenylindenyl)hafnium dimethyl 1-Silacyclopentane-1,1-bis(2-methyl-4-phenylindenyl)hafnium dimethyl 1-Silacyclopentane-1,1-bis(2-ethyl-4-phenylindenyl)titanium bromide methyl 1-Silacyclopentane-1,1-bis(2-methyl-4,6-diisopropylindenyl)titanium dimethyl 1-Silacyclopentane-1,1-bis(2-ethyl-4,6-diisopropylindenyl)titanium dimethyl 1-Silacyclopentane-1,1-bis(2-methyl-4-naphthylindenyl)scandium methyl 1-Silacyclopentane-1,1-bis(2-ethyl-4-naphthylindenyl)hafnium dimethyl Bis(cyclopentadienyl)titanium dimethyl Ethylene-1,2-bis(indenyl)scandium methyl Ethylene-1,2-bis(tetrahydroindenyl)titanium dimethyl Ethylene-1-cyclopentadienyl-2-(1-indenyl)hafnium dimethyl Ethylene-1-cyclopentadienyl-2-(2-indenyl)titanium bromide methyl Ethylene-1-cyclopentadienyl-2-(2-methyl-1-indenyl)hafnium dimethyl Ethylene-1,2-bis(2-methylindenyl)hafnium dimethyl Ethylene-1,2-bis(2-ethylindenyl)hafnium dimethyl Ethylene-1,2-bis(2-methyl-4,5-benzoindenyl)hafnium dimethyl Ethylene-1,2-bis(2-ethyl-4,5-benzoindenyl)titanium dimethyl Ethylene-1,2-bis(4,5-dihydro-8-methyl-7H-cyclopent[e]acenaphthylen-7-ylidene)titanium dimethyl Ethylene-1-(2-methyl-4,5-benzoindenyl)-2-(2-methyl-4-phenylindenyl)-titanium dimethyl Ethylene-1-(2-ethyl-4,5-benzoindenyl)-2-(2-methyl-4-phenylindenyl)titanium dimethyl Ethylene-1-(2-methyl-4, 5-benzoindenyl)-2-(2-ethyl-4-phenylindenyl)-scandium methyl Ethylene(1-(2-ethyl-4,5-benzoindenyl)-2-(2-ethyl-4-naphthylindenyl)-hafnium dimethyl Ethylene-1-(2-methylindenyl)-2-(4-phenylindenyl)titanium dimethyl Ethylene-1,2-bis(2-methyl-4-phenylindenyl)hafnium dimethyl Ethylene-1,2-bis(2-ethyl-4-phenylindenyl)hafnium dimethyl Ethylene-1,2-bis(2-methyl-4,6-diisopropylindenyl)hafnium dimethyl Ethylene-1,2-bis(2-ethyl-4,6-diisopropylindenyl)titanium dimethyl Ethylene-1,2-bis(2-methyl-4-naphthylindenyl)titanium dimethyl Ethylene-1,2-bis(2-ethyl-4-naphthylindenyl)hafnium dimethyl Propylene-2,2-bis(indenyl)hafnium dimethyl Propylene-2-cyclopentadienyl-2-(1-indenyl)titanium dimethyl Propylene-2-cyclopentadienyl-2-(4-phenyl-1-indenyl)titanium dimethyl Propylene-2-cyclopentadienyl-2-(9-fluorenyl)hafnium dimethyl Propylene-2-cyclopentadieryl-2-(2,7-dimethoxy-9-fluorenyl)hafnium dimethyl Propylene-2-cyclopentadienyl-2-(2,7-di-tert-butyl-9-fluorenyl)hafnium dimethyl Propylene-2-cyclopentadienyl-2-(2,7-dibromo-9-fluorenyl)titanium dimethyl Propylene-2-cyclopentadienyl-2-(2,7-diphenyl-9-fluorenyl)hafnium dimethyl Propylene-2-cyclopentadienyl-2-(2,7-dimethyl-9-fluorenyl)titanium dimethyl Propylene-2-(3-methylcyclopentadienyl)-2-(2,7-dibutyl-9-fluorenyl)hafnium dimethyl Propylene-2-(3-tert-butylcyclopentadienyl)-2-(2,7-dibutyl-9-fluorenyl)titanium dimethyl Propylene-2-(3-trimethylsilylcyclopentadienyl)-2-(3,6-di-tert-butyl-9-fluorenyl)titanium dimethyl Propylene-2-cyclopentadienyl-2-[2,7-bis(3-buten-1-yl)-9-fluorenyl]hafnium dimethyl Propylene-2-cyclopentadienyl-2-(3-tert-butyl-9-fluorenyl)titanium dimethyl Propylene-2,2-bis(tetrahydroindenyl)hafnium dimethyl Propylene-2,2-bis(2-methylindenyl)hafnium dimethyl Propylene-2,2-bis(2-ethylindenyl)titanium dimethyl Propylene-2,2-bis(2-methyl-4,5-benzoindenyl)titanium dimethyl Propylene-2,2-bis(2-ethyl-4,5-benzoindenyl)hafnium dimethyl Propylene-2,2-bis(4,5-dihydro-8-methyl-7H-cyclopent[e]acenaphthylen-7-ylidene)hafnium dimethyl Propylene-2-(2-methyl-4,5-benzoindenyl)-2-(2-methyl-4-phenylindenyl)-hafnium dimethyl Propylene-2-(2-ethyl-4,5-benzoindenyl)-2-(2-methyl-4-phenylindenyl)titanium dimethyl Propylene-2-(2-methyl-4,5-benzoindenyl)-2-(2-ethyl-4-phenylindenyl)hafnium dimethyl Propylene-2-(2-ethyl-4,5-benzoindenyl)-2-(2-ethyl-4-naphthylindenyl)titanium dimethyl Propylene-2-(2-methylindenyl)-2-(4-phenylindenyl)hafnium dimethyl Propylene-2,2-bis(2-methyl-4-phenylindenyl)titanium dimethyl Propylene-2,2-bis(2-ethyl-4-phenylindenyl)hafnium dimethyl Propylene-2,2-bis(2-methyl-4,6-diisopropylindenyl)titanium dimethyl Propylene-2,2-bis(2-ethyl-4,6-diisopropylindenyl)hafnium dimethyl Propylene-2,2-bis(2-methyl-4-naphthylindenyl)titanium dimethyl Propylene-2,2-bis(2-ethyl-4-naphthylindenyl)titanium dimethyl 1,6-Bis[methylsi lylbis(2-methyl-4-phenylindenyl)hafnium dimethyl]hexane 1,6-Bis[methylsilylbis(2-methyl-4,5-benzoindenyl)titanium dimethyl]hexane 1,6-Bis[methylsilylbis(2-ethyl-4-phenylindenyl)hafnium dimethyl]hexane 1,6-Bis[methylsilylbis(2-methyl-4-naphthylindenyl) titanium dimethyl]hexane 1,6-Bis[methylsilylbis(2-methyl-4,6-diisopropylindenyl) hafnium dimethyl]hexane 1,6-Bis[methylsilyl(2-methyl-4-phenylindenyl)(4,5-benzoindenyl)titanium dimethyl]hexane 1-[Methylsilylbis(tetrahydroindenyl)hafnium dimethyl]-6-[ethylstannyl(cyclopentadienyl)-(fluorenyl)titanium dimethyl]hexane 1,6-Disila-1,1,6,6-tetramethyl-1,6-bis[methylsilylbis(2-methyl-4-phenylindenyl)hafnium dimethyl]hexane 1,4-Disila-1,4-bis[methylsilylbis(2-methyl-4-phenylindenyl)hafnium dimethyl]cyclohexane

[1,4-Bis(1-indenyl)-1,1,4,4-tetramethyl-1,4-disilabutane] bis(pentamethylcyclopentadienylhafnium dimethyl)

[1,4-Bis(9-fluorenyl)-1,1,4,4-tetramethyl-1,4-disilabutane]bis(cyclopentadienylhafnium dimethyl)

[1,4-Bis(1-indenyl)-1,1,4,4-tetramethyl-1,4-disilabutane] bis(cyclopentadienyltitanium dimethyl)

[1-(1-indenyl)-6-(2-phenyl-1-indenyl)-1,1,6,6-tetraethyl-1,6-disila-4-oxa-hexane]bis(tert-butylcyclopentadienyltitanium dimethyl)

[1,10-Bis(2,3-dimethyl-1-indenyl)-1,1,10,10-tetramethyl-1,10-digerma-decane]bis(2-methyl-4-phenylindenylhafnium dimethyl)

(1-Methyl-3-tert-butylcyclopentadienyl)(1-phenyl-4-methoxy-7-chlorofluorenyl)titanium dimethyl (4,7-Dichloroindenyl)(3,6-dimesitylfluorenyl)titanium dimethyl Bis(2,7-di-tert-butyl-9-cyclohexylfluorenyl)hafnium dimethyl (2,7-Dimesitylfluorenyl)[2,7-bis(1-naphthyl)fluorenyl] hafnium dimethyl Dimethylsilylbis(fluorenyl)titanium dimethyl Dibutylstannylbis(2-methylfluorenyl)hafnium dimethyl 1,1,2,2-Tetraethyidisilanediyl(2-methylindenyl)(4-phenylfluorenyl)titanium dimethyl Propylene-1-(2-indenyl)-2-(9-fluorenyl)hafnium dimethyl 1,1-Dimethyl-1-silaethylenebis(fluorenyl)titanium dimethyl

[4-(Cyclopentadienyl)-4,7,7-trimethyl (tetrahydroindenyl)]titanium dimethyl

[4-(Cyclopentadienyl)-4,7-dimethyl-7-phenyl(5,6-dimethyltetrahydroindenyl)]hafnium dimethyl

[4-(Cyclopentadienyl)-4,7-dimethyl-7-(1-naphthyl)(7-phenyltetrahydroindenyl)]titanium dimethyl

[4-(Cyclopentadienyl)-4,7-dimethyl-7-butyl(6,6-diethyltetrahydro-indenyl)]hafnium dimethyl

[4-(3-tert-Butylcyclopentadienyl)-4,7,7-trimethyl (tetrahydroindenyl)]hafnium dimethyl

[4-(1-Indenyl)-4,7,7-trimethyl(tetrahydroindenyl)] titanium dimethyl

Bis(cyclopentadienyl)zirconium dichloride

Bis(indenyl)zirconium dichloride

Bis(fluorenyl)zirconium dichloride (Indenyl)(fluorenyl)zirconium dichloride

Bis(cyclopentadienyl)titanium dichloride

Dimethylsilanediylbis(indenyl)zirconium dichloride

Dimethylsilanediylbis(tetrahydroindenyl)zirconium dichloride

Dimethylsilanediylbis(cyclopentadienyl)(indenyl) zirconium dichloride

Dimethylsilanediylbis(2-methylindenyl)zirconium dichloride

Dimethylsilanediylbis(2-ethylindenyl)zirconium dichloride

Dimethylsilanediylbis(2-methyl-4,5-benzoindenyl) zirconium dichloride

Dimethylsilanediylbis(2-ethyl-4,5-benzoindenyl) zirconium dichloride

Dimethylsilanediylbis(2-methyl-4-phenylindenyl) zirconium dichloride

Dimethylsilanediylbis(2-ethyl-4-phenylindenyl) zirconium dichloride

Dimethylsilanediylbis(2-methyl-4,6-diisopropylindenyl) zirconium dichloride

Ethylene-1,2-bis(indenyl)zirconium dichloride

Ethylene-1,2-bis(tetrahydroindenyl)zirconium dichloride

Ethylene-1,2-bis(2-methylindenyl)zirconium dichloride

Ethylene-1,2-bis(2-ethylindenyl)zirconium dichloride

Ethylene-1,2-bis(2-methyl-4,5-benzoindenyl)zirconium dichloride

Ethylene-1,2-bis(2-methyl-4-phenylindenyl)zirconium dichloride

Ethylene-1,2-bis(2-ethyl-4-phenylindenyl)zirconium dichloride

Ethylene-1,2-bis(2-methyl-4,6-diisopropylindenyl) zirconium dichloride

Propylene-2,2-bis(indenyl)zirconium dichloride

Propylene-2,2-(cyclopentadienyl)(indenyl)zirconium dichloride

Propylene-2,2-(cyclopentadienyl)(fluorenyl)zirconium dichloride

Bis(cyclopentadienyl)($\eta^4$-butadiene)zirconium

Bis(methylcyclopentadienyl)($\eta^4$-butadiene)zirconium

Bis(n-butyl-cyclopentadienyl)($\eta^4$-butadiene)zirconium

Bisindenyl($\eta^4$-butadiene)zirconium (tert-butylamido)dimethyl(tetramethyl-5-cyclopentadienyl)silane($\eta^4$-butadiene)zirconium Bis(2-methylbenzoindenyl)($\eta^4$-butadiene)zirconium Dimethylsilanediylbis(2-methyl-indenyl)($\eta^4$-butadiene) zirconium Dimethylsilanediylbisindenyl($\eta^4$-butadiene)zirconium Dimethylsilanediylbis(2-methyl-4,5-benzoindenyl)($\eta^4$-butadiene)zirconium Dimethylsilanediyl(2-methyl-4,5-benzoindenyl)(2-methylindenyl)($\eta^4$-butadiene)zirconium Dimethylsilanediyl(2-methyl-4,5-benzoindenyl)(2-methyl-4-phenylindenyl)($\eta^4$-butadiene)zirconium Dimethylsilanediyl(2-methylindenyl)(4-phenylindenyl) ($\eta^4$-butadiene)zirconium Dimethylsilanediylbis(2-methyl-4-phenyl-indenyl)($\eta^4$-butadiene)zirconium Dimethylsilanediylbis(2-methyl-4,6-diisopropyl-indenyl) ($\eta^4$-butadiene)zirconium Dimethylsilanediylbis(2-methyl-4,5-diisopropyl-indenyl) ($\eta^4$-butadiene)zirconium Dimethylsilanediylbis(2-ethyl-4-naphthyl-indenyl)($\eta^4$-butadiene)zirconium Dimethylsilanediyl(3-t-butylcyclopentadienyl) (fluorenyl)-($\eta^4$-butadiene)zirconium Dimethylsilanediylbis(2-ethyl-4-phenylindenyl)($\eta^4$-butadiene)zirconium Dimethylsilanediylbis(2,3,4-trimethylindenyl)($\eta^4$-butadiene)zirconium Dimethylsilanediylbis(2,4-dimethylindenyl)($\eta^4$-butadiene)zirconium Dimethylsilanediylbis(2,4,7-trimethylindenyl)($\eta^4$-butadiene)zirconium Dimethylsilanediylbis(4,5-dihydro-8-methyl-7H-cyclopent[e]acenaphthylen-7-ylidene)($\eta^4$-butadiene)zirconium Isopropylidene(cyclopentadienyl)(fluorenyl)($\eta^4$-butadiene)zirconium Isopropylidene(3-methylcyclopentadienyl)(fluorenyl)($\eta^4$-butadiene)zirconium Isopropylidene(cyclopentadienyl)(indenyl)($\eta^4$-butadiene)zirconium Ethylene-1,2-bis(2-methyl-indenyl)($\eta^4$-butadiene)zirconium Ethylene-1,2-bisindenyl($\eta^4$-butadiene)zirconium Ethylene-1,2-bis(2-methyl-4,5-benzoindenyl)($\eta^4$-butadiene)zirconium Ethylene-1,2-bis(2-methyl-4-phenyl-indenyl)($\eta^4$-butadiene)zirconium Ethylene-1,2-bis(2-methyl-4,6-diisopropyl-indenyl)($\eta^4$-butadiene)zirconium Ethylene-1,2-bis(2-methyl-4,5-diisopropyl-indenyl)($\eta^4$-butadiene)zirconium Ethylene-1,2-bis(2-ethyl-4-naphthyl-indenyl)($\eta^4$-butadiene)zirconium Ethylene-1,2-(3-t-butylcyclopentadienyl)(fluorenyl)($\eta^4$-butadiene)zirconium Ethylene-1,2-bis(2-ethyl-4-phenylindenyl)($\eta^4$-butadiene)zirconium Ethylene-1,2-bis(2, 3,4-trimethylindenyl)($\eta^4$-butadiene)zirconium Ethylene-1,2-bis(2,4-dimethylindenyl)($\eta^4$-butadiene)zirconium Ethylene-1,2-bis(2,4,7-trimethylindenyl)($\eta^4$-butadiene)zirconium Ethylene-1,2-bis(4,5-dihydro-8-methyl-7H-cyclopent[e]acenaphthylen-7-ylidene)($\eta^4$-butadiene)zirconium (2-methyl-4,5-benzoindenyl)(2-methyl-indenyl)($\eta^4$-butadiene)zirconium Propylene-2,2-bis(2-methyl-4-phenyl-indenyl)($\eta^4$-butadiene)zirconium Propylene-2,2-bis(2-methyl-4,6-diisopropyl-indenyl)($\eta^4$-butadiene)zirconium Propylene-2,2-bis(2-ethyl-4-naphthyl-indenyl)($\eta^4$-butadiene)zirconium Propylene-2,2-(3-t-butylcyclopentadienyl)(fluorenyl)(7l$^4$-butadiene)zirconium Propylene-2,2-bis(2-ethyl-4-phenylindenyl)($\eta^4$-butadiene)zirconium Propylene-2,2-bis(2,4-dimethylindenyl)($\eta^4$-butadiene)zirconium Propylene-2,2-bis(2-methyl-indenyl)($\eta^4$-butadiene)zirconium Propylene-2,2-bisindenyl($\eta^4$-butadiene)zirconium Propylene-2,2-bis(2-methyl-4,5-benzoindenyl)($\eta^4$-butadiene)zirconium Diphenylsilanediylbis(2-methyl-indenyl)($\eta^4$-butadiene)zirconium Diphenylsilanediylbisindenyl($\eta^4$-butadiene)zirconium Diphenylsilanediylbis(2-methyl-4,5-benzoindenyl)($\eta^4$-butadiene)zirconium Diphenylsilanediyl(2-methyl-4,5-benzoindenyl)(2-methylindenyl)($\eta^4$-butadiene)zirconium Diphenylsilanediyl(2-methyl-4, 5-benzoindenyl)(2-methyl-4-phenylindenyl) ($\eta^4$-butadiene)zirconium Diphenylsilanediylbis(2-methyl-4-pheny-indenyl)($\eta^4$-butadiene)zirconium Diphenylsilanediylbis(2-methyl-4,6-diisopropyl-indenyl)($\eta^4$-butadiene)zirconium Diphenylsilanediylbis(2-methyl-4,5-diisopropyl-indenyl)($\eta^4$-butadiene)zirconium Diphenylsilanediylbis(2-ethyl-4-naphthyl-indenyl)($\eta^4$-butadiene)zirconium Diphenylsilanediyl(3-t-butylcyclopentadienyl)(fluorenyl)($\eta^4$-butadiene)-zirconium Diphenylsilanediylbis(2-ethyl-4-phenylindenyl)($\eta^4$-butadiene)zirconium Diphenylsilanediylbis(2,4-dimethylindenyl)($\eta^4$-butadiene)zirconium Diphenylsilanediylbis(2,4,7-trimethylindenyl)($\eta^4$-butadiene)zirconium Diphenylsilanediyl-(3-(trimethylsilyl)cyclopentadienyl)(fluorenyl)($\eta^4$-butadiene)zirconium Diphenylsilanediylbis(4,5-dihydro-8-methyl-7H-cyclopent[e]acenaphthylen-7-ylidene)($\eta^4$-butadiene)zirconium Phenylmethylsilanediylbis(2-methyl-indenyl)($\eta^4$-butadiene)zirconium Phenylmethylsilanediylbisindenyl($\eta^4$-butadiene)zirconium Phenylmethylsilanediylbis(2-methyl-4,5-benzoindenyl)($\eta^4$-butadiene)-zirconium Phenylmethylsilanediyl(2-methyl-4,5-benzoindenyl)(2-methyl-indenyl) ($\eta^4$-butadiene)zirconium Phenylmethylsilanediyl(2-methyl-4,5-benzoindenyl)(2-methyl-4-phenyl-indenyl)($\eta^4$-butadiene)zirconium Phenylmethylsilanediyl(2-methylindenyl)(4-phenylindenyl)($\eta^4$-butadiene-)zirconium Phenylmethylsilanediylbis(2-methyl-4-phenyl-indenyl)($\eta^4$-butadiene)-zirconium Phenylmethylsilanediylbis(2-ethyl-4-phenyl-indenyl)($\eta^4$-butadiene)-zirconium Phenylmethylsilanediylbis(2-methyl-4,6-diisopropyl-indenyl)($\eta^4$-butadiene)zirconium Phenylmethylsilanediylbis(2-methyl-4-naphthyl-indenyl)($\eta^4$-butadiene)-zirconium 1,6-{Bis[methylsilyl-bis(2-methyl-4-phenyl-indenyl)($\eta^4$-butadiene)-zirconium]}hexane 1,6-{Bis[methylsilyl-bis(2-ethyl-4-phenyl-indenyl)($\eta^4$-butadiene)-zirconium]}hexane 1,6-{Bis[methylsilyl-bis(2-methyl-4-naphthyl-indenyl)($\eta^4$-butadiene)-zirconium]}hexane 1,6-{Bis[methylsilyl-bis(2-methyl-4,5-benzoindenyl)($\eta^4$-butadiene)-zirconium]}hexane 1,6-{Bis[methylsilyl-(2-methyl-4-phenyl-indenyl)(2-methyl-indenyl)($\eta^4$-butadiene)zirconium]}hexane 1,2-{Bis[methylsilyl-bis(2-methyl-4-phenyl-indenyl)($\eta^4$-butadiene)-zirconium]}ethane 1,2-{Bis[methylsilyl-bis(2-ethyl-4-phenyl-indenyl)($\eta^4$-butadiene)-zirconium]}ethane 1,2-{Bis[methylsilyl-bis(2-methyl-4-naphthyl-indenyl)($\eta^4$-butadiene)-zirconium]}ethane 1,2-{Bis[methylsilyl-bis(2-methyl-4,5-benzoindenyl)($\eta^4$-butadiene)-zirconium]}ethane 1,2-{Bis[methylsilyl-(2-methyl-4-phenyl-indenyl)(2-methyl-indenyl)($\eta^4$-butadiene)zirconium]}ethane Methylphenylmethylene(fluorenyl)(cyclopentadienyl)($\eta^4$-butadiene)-zirconium Diphenylmethylene(fluorenyl)(cyclopentadienyl)($\eta^4$-butadiene)zirconium 4-Cyclopentadienyl-4,7,7-trimethyltetrahydroindenylzirconium dimethyl Dimethylsilanediyl(tert-butylamido)(tetramethylcyclopentadienyl)zirconium dimethyl Dimethylsilanediyl(tert-butylamido)(cyclopentadienyl)zirconium dimethyl Dimethylsilanediyl(tert-butylamido)(indenyl)zirconium dimethyl Dimethylsilanediyl(tert-butylamido)(indenyl)titanium dimethyl Dimethylsilanediyl(cyclohexylamido)(methylcyclopentadienyl)zirconium dimethyl Dimethylsilanediyl(cyclohexylamido)(methylcyclopentadienyl)titanium dimethyl Preparation processes for metallocenes of the formula I are described, for example, in Journal of Organometallic Chem. 1985, 288, 63–67 and in the documents cited therein.

The cocatalyst component is at least one compound of the formula (II) which by reaction with a transition metal compound such as a metallocene converts it into a cationic compound.

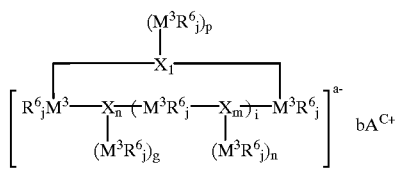

(II)

in which

R$^6$ independently at each occurrence is identical or different and is a halogen atom or a C$_1$–C$_{40}$ carbon-containing group, such as a C$_1$–C$_{40}$-alkyl, C$_1$–C$_{40}$-haloalkyl, C$_6$–C$_{40}$-aryl, C$_6$–C$_{40}$-haloaryl-, C$_7$–C$_{40}$-arylalkyl or C$_7$–C$_{40}$-halo-arylalkyl group, X independently at each occurrence is identical or different and is a C$_1$–C$_{40}$ carbon-containing group, for example a divalent, carbon-containing group, such as a C$_1$–C$_{40}$-alkylene, C$_1$–C$_{40}$-haloalkylene, C$_6$–C$_{40}$-arylene, C$_6$–C$_{40}$-haloarylene, C$_7$–C$_{40}$-arylalkylene or C$_7$–C$_{40}$-haloarylalkylene, C$_2$–C$_{40}$-alkynylene, C$_2$–C$_{40}$-haloalkynylene, C$_2$–C$_{40}$-alkenylene or C$_2$–C$_{40}$-haloalkenylene group, or a trivalent, carbon-containing group, such as a C$_1$–C$_{40}$-alkanetriyl, C$_1$–C$_{40}$-haloalkanetriyl, C$_6$–C$_{40}$-arenetriyl, C$_6$–C$_{40}$-haloarenetriyl, C$_7$–C$_{40}$-arenealkanetriyl, C$_7$–C$_{40}$-haloarenealkanetriyl, C$_2$–C$_{40}$-alkynetriyl, C$_2$–C$_{40}$-haloalkynetriyl, C$_2$–C$_{40}$-alkenetriyl or C$_2$–C$_{40}$-haloalkenetriyl group, M$^3$ independently at each occurrence is identical or different and is an element of group IIa, IIIa, IVa or Va of the Periodic Table of the Elements, a is an integer from 0 to 10, b is an integer from 0 to 10, c is an integer from 0 to 10 and a=b c, n is 0 or 1, m is 0 or 1, l is 0 or 1, g is an integer from 0 to 10, h is an integer from 0 to 10, p is an integer from 0 to 10, i is an integer from 0 to 1000, j is an integer from 1 to 6, and A is a cation of group Ia, IIa, IIIa of the Periodic Table of the Elements, a carbenium, oxonium or sulfonium cation, or a quaternary ammonium compound.

If a is 0 then the chemical compound is neutral; if a is $\geq 1$, then it is a negatively charged compound with b cations A$^{c+}$ as counterions.

If the chemical compound of the formula (II) has two or more groups M$^3$R$_j$, then these groups can be identical to or different from one another. The number j of radicals R in a group M$^3$R$_j$ depends on the (co)valence of M$^3$.

The structural unit X joins the elements M$^3$ to one another by covalent bonds. X can have a linear, cyclic or branched carbon framework.

R$^6$ is preferably a C$_1$–C$_{40}$ hydrocarbon radical which can be halogenated, preferably perhalogenated, with halogens such as fluorine, chlorine, bromine or iodine, and in particular is a halogenated, especially perhalogenated, C$_1$–C$_{30}$-alkyl group, such as trifluoromethyl, pentachloroethyl, heptafluoroisopropyl or monofluoroisobutyl or a halogenated, especially perhalogenated, C$_6$–C$_{30}$-aryl group, such as pentafluorophenyl, heptachloronaphthyl, heptafluoronaphthyl, heptafluorotolyl, 3,5-bis(trifluoromethyl)phenyl, 2,4,6-tris(trifluoromethyl)phenyl or 2,2'-(octafluoro)biphenyl.

X is preferably a C$_6$–C$_{30}$-arylene group, a C$_2$–C$_{30}$-alkenylene group or a C$_2$–C$_{30}$-alkynylene group which can be halogenated, especially perhalogenated. Preferably j is 1 or 2 if M$^3$ is an element of group IIa, 2 or 3 if M$^3$ is an element of group IIIa, 3 or 4 if M$^3$ is an element of group IVa and 4 or 5 if M$^3$ is an element of group Va. With particular preference, M$^3$ is boron as an element of group IIIa.

i is preferably an integer from 0 to 6, particularly preferably 0 or 1.

a, b and c are preferably 0, 1 or 2.

g, h and p are preferably 0 or 1.

Preferred cations A are carbenium ions (R$_3$C$^+$) or quaternary ammonium ions having an acidic H function (R$_3$NH$^+$). Particular preference is given to quaternary ammonium salts having acidic H functions.

If a is $\geq 1$ and all M are boron, it is preferred for the number of boron atoms to be $\leq 4$, particularly preferably 2.

Examples of compounds of the formula (II) are:

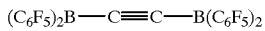

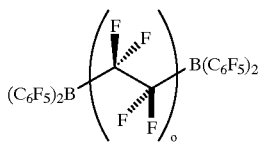

-continued

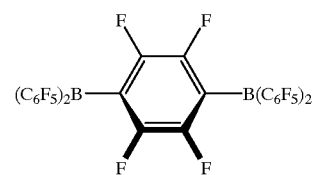

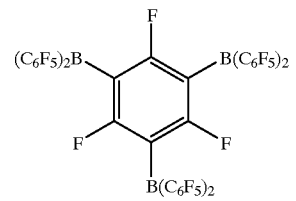

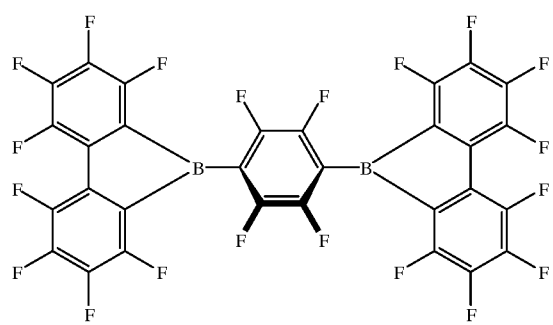

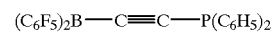

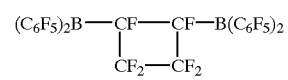

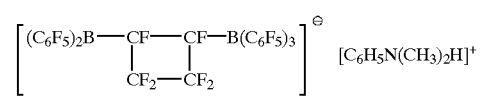

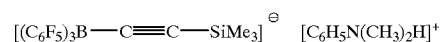

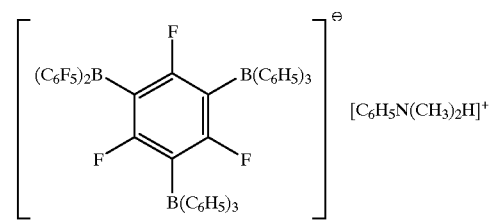

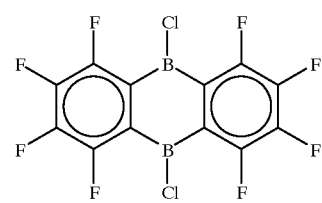

-continued

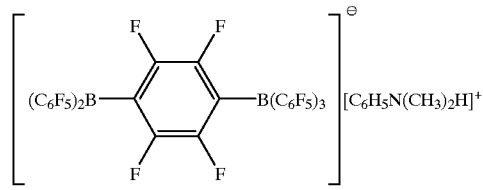

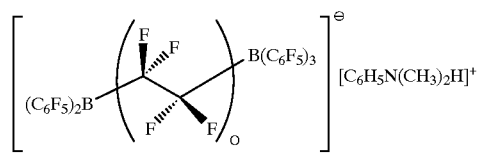

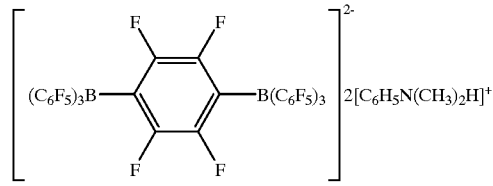

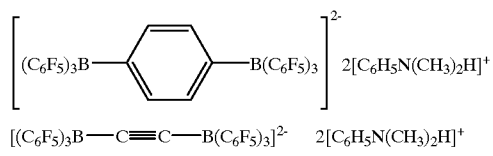

$[(C_6F_5)_3B\text{—}C\equiv C\text{—}B(C_6F_5)_3]^{2-}$  $2[C_6H_5N(CH_3)_2H]^+$ Instead of the N,N-dimethylanilinium cation $[C_6H_5N(CH_3)_2H]^+$ it is alternatively possible to employ $CPh^+_3$ as cation.

The preparation of a compound of the formula II can take place, for example, in accordance with the following reaction scheme:

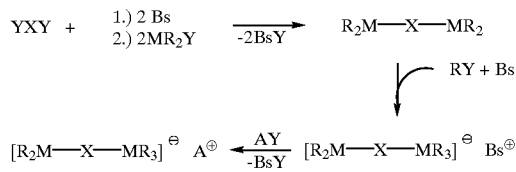

where

X is a $C_1$–$C_{40}$ carbon-containing group, such as a $C_1$–$C_{40}$-alkylene, $C_1$–$C_{40}$-haloalkylene, $C_6$–$C_{40}$-arylene, $C_6$–$C_{40}$-haloarylene, $C_7$–$C_{40}$-arylalkylene or $C_7$–$C_{40}$-halo-arylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group, Y independently at each occurrence is identical or different and is a leaving group, preferably a hydrogen or halogen atom, R independently at each occurrence is identical or different and is a halogen atom or a $C_1$–$C_{40}$ carbon-containing group, such as a $C_1$–$C_{40}$-alkyl, $C_1$–$C_{40}$-haloalkyl, $C_6$–$C_{40}$-aryl, $C_6$–$C_{40}$-haloaryl, $C_7$–$C_{40}$-arylalkyl or $C_7$–$C_{40}$-haloarylalkyl group, Bs is a base, preferably an organolithium compound or a Grignard compound, M is identical or different at each occurrence and is an element of groups IIa, IIIa, IVa or Va of the Periodic Table of the Elements, and A is a cation of group Ia, IIAa, IIIa of the Periodic Table of the Elements, a carbenium, oxonium or sulfonium cation, or a quaternary ammonium compound.

The support component of the novel catalyst system is preferably a porous inorganic or organic solid. The novel support is preferably rendered inert or chemically modified so that the metallocene component and cocatalyst component are not bonded covalently to the support. The support component preferably comprises at least one inorganic oxide, such as silica, alumina, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, especially silica and/or alumina. The support can also comprise at least one polymer, for example a homopolymer or copolymer, a crosslinked polymer or polymer blends. Examples of polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The support can have a specific surface area in the range from 10 to 1000 m$^2$/g, preferably from 150 to 500 m$^2$/g and, with particular preference, from 200 to 400 m$^2$/g. The mean particle size of the support can be from 1 to 500 μm, preferably from 5 to 350 μm and, with particular preference, from 10 to 200 μm.

The support is preferably porous, with a pore volume of from 0.5 to 4.0 ml/g, preferably from 1.0 to 3.5 ml/g and, with very particular preference, from 1.2 to 3 ml/g. The porous structure of the support results in a proportion of voids (pore volume) in the support particles, support material or support molding. The form of the pores is irregular, in many cases spherical. The pores can be interconnected by way of small pore openings. The pore diameter is from about 2 to 50 nm.

The particle form of the porous support is dependent on the pre- and aftertreatment and can be irregular or spherical. The support particle size can be adjusted at will by means, for example, of cryogenic milling, granulation and/or sieving.

To prepare a novel support which has been rendered inert it is preferred to mix an inorganic oxide, especially silica, with an organometallic compound. The organometallic compound is preferably an organoaluminum compound and with particular preference comprises organoaluminum compounds containing linear, cyclic or branched, saturated or unsaturated $C_1$–$C_{20}$ carbon-containing groups, such as trimethylaluminum, triethylaluminum, triisobutylaluminum, tripropylaluminum, tri-n-butylaluminum, tri-sec-butylaluminum, trihexylaluminum, tridodecylaluminum, triphenylaluminum, tri(cyclohexyl)aluminum, dimethylaluminum methoxide, diethylaluminum ethoxide, diisobutylaluminum methoxide, diethylaluminum trimethylsilyl oxide, lithium butyldiisobutylaluminum, lithium tri-tert-butoxyaluminum, lithium tert-butyidiisobutylaluminum and/or diisobutylaluminum trimethylsilyl oxide. Also envisaged are organomagnesium or organoboron compounds, such as diethylmagnesium, diisopropylmagnesium, dibutylmagnesium, dioctylmagnesium, dicyclohexylmagnesium, dibenzylmagnesium, ditolylmagnesium, ethylmagnesium ethoxide, octylmagnesium ethoxide, octylmagnesium octoxide, ethylpropylmagnesium, ethylbutylmagnesium, amylhexylmagnesium, n-butyl-sec-butylmagnesium, butyloctylmagnesium, triethylborane, triisobutylborane, tripropylborane, tri-n-butylborane, tri-sec-butylborane, trihexylborane, triphenylborane, tri(cyclohexyl)borane, dimethylmethoxyborane, diisobutylmethoxyborane, diethyltrimethylsilyloxyborane, lithium butyldiisobutylborane, lithium tri-tert-butoxyborane, lithium tert-butyldiisobutylborane, 2-biphenylboronic acid, tris(trimethylsilylmethyl)borane and/or phenylboronic acid.

Very particular preference is given to the use of trimethylaluminum, tributylaluminum, triethylborane and/or tributylborane.

To render the support inert, the support starting material is dried, for example at from 100° C. to 800° C. and at from 0.01 bar to 0.001 bar or at from 100° C. to 800° C. in a stream or inert gas for 5–15 h, in order to remove physisorbed water, and then is reacted with at least one organometallic compound. The preparation takes place in an appropriate solvent, such as pentane, hexane, heptane, toluene or dichloromethane, in which the support starting material is suspended. To this suspension there is added, slowly and dropwise, a solution of the organoaluminum compound, for example an aluminum alkyl solution, and mixing is effected by stirring. The support starting material can also be mixed in dry form with a solution of the organoaluminum compound, with stirring. The reaction temperature is preferably from −20 to +150° C., especially 15–40° C. The reaction time is from 1 to 120 minutes, preferably 10–30 minutes. The concentration of aluminum employed is preferably greater than 0.01 mol/l, in particular greater than 0.5 mol/l. It is preferred to use from 0.01 to 0.1 mol of aluminum compound per g of support material. The reaction is conducted under inert conditions. The solvent is subsequently separated off. The residue is washed twice with an appropriate solvent, such as pentane, hexane, heptane, toluene or dichloromethane, and is dried if desired under an oil pump vacuum at from 20 to 40° C. and from 0.01 to 0.001 bar.

To prepare a novel support which has been chemically modified, the support starting material is dried at from 100° C. to 800° C. at from 0.01 bar to 0.001 bar or at from 100° C. to 800° C. in a stream of inert gas for 5–15 h, in order to remove physisorbed water, and then is preferably reacted with at least one organosilicon compound of the formula (III).

$$SiR^7{}_wR^8{}_xR^9{}_yR^{10}{}_z \quad (III)$$

in which $R^7$, $R^8$, $R^9$, $R^{10}$ independently of one another are identical or different and are a $C_1$–$C_{30}$ carbon-containing group, for example a $C_1$–$C_{20}$-alkyl group, $C_2$–$C_{20}$-alkenyl group, a $C_5$–$C_{30}$-aryl group, a $C_5$–$C_{30}$-arylalkyl group, a $C_5$–$C_{30}$-arylalkenyl group, a $C_5$–$C_{30}$-alkylaryl group, a $C_1$–$C_{20}$-alkyloxy group, a $C_1$–$C_{20}$-alkenyloxy group, $C_5$–$C_{30}$-aryloxy group, $C_1$–$C_{20}$-alkoxyalkyl group, $C_5$–$C_{30}$-alkylaryloxy group, $C_5$–$C_{30}$-arylalkyloxy group, a $C_1$–$C_{20}$-alkylamino group, $C_1$–$C_{20}$-alkylaminoalkyl group, a $C_5$–$C_{20}$-arylamino group, a $C_1$–$C_{20}$-alkylphosphino group, $C_1$–$C_{20}$-alkylphosphinoalkyl group, a $C_5$–$C_{20}$-arylphosphino group, a $C_5$–$C_{20}$-arylthio group, a $C_2$–$C_{20}$-alkenylthiol group, a $C_1$–$C_{20}$-alkylthiol group, a $C_1$–$C_{20}$-alkylthioalkyl group, a $C_1$–$C_{20}$-alkylthioaryl group, a $C_5$–$C_{20}$-arylthioalkenyl group, a $C_1$–$C_{20}$-fluoroalkyl group, a $C_5$–$C_{20}$-fluoroaryl group or a $C_2$–$C_{20}$-fluoroalkenyl group and where at least one of the radicals $R^7$, $R^8$, $R^9$ and $R^{10}$ is a halogen atom, a hydroxyl group, a hydrogen atom, a $C_1$–$C_{20}$-alkoxy, a $C_5$–$C_{30}$-aryloxy or a $C_1$–$C_{20}$-alkoxyalkyl group and w, x, y, z are 0, 1, 2, 3 or 4 and w+x+y+z is 4. The radicals $R^7$ to $R^{10}$ can bridge organosilicon units.

In formula (III), preferably, $R^7$, $R^8$, $R^9$ and $R^{10}$ independently of one another are identical or different and are a $C_1$–$C_{30}$ carbon-containing group, such as a $C_1$–$C_{20}$-alkyl group, $C_2$–$C_{20}$-alkenyl group, a $C_5$–$C_{30}$-arylalkyl group, a $C_5$–$C_{30}$-arylalkenyl group, a $C_1$–$C_{20}$-alkyloxy group, a $C_1$–$C_{20}$-alkylamino group, a $C_5$–$C_{20}$-arylamino group, a $C_1$–$C_{20}$-alkylphosphino group, a $C_5$–$C_{20}$-arylphosphino group, a $C_5$–$C_{20}$-arylthiol group, a $C_1$–$C_{20}$-alkylthiol group, a $C_1$–$C_{20}$-alkylthioalkyl group, a $C_1$–$C_{20}$-alkylthioaryl group, a $C_5$–$C_{20}$-arylthioalkenyl group, a $C_1$–$C_{20}$-fluoroalkyl group or a $C_5$–$C_{20}$-fluoroaryl group and w, x, y, z are 0, 1, 2, 3 or 4 and w+x+y+z is 4 and at least one of the radicals $R^7$, $R^8$, $R^9$, $R^{10}$ is a halogen atom, a hydroxyl group, a hydrogen atom or a $C_1$–$C_{20}$-alkoxy group.

Examples of the organosilicon compound according to the invention are 3,3,3-Trifluoropropyltrichlorosilane 1H, 1H,2H,2H-Perfluorodecyltrichlorosilane 1H,1H ,2H,2H-Perfluorooctyltrichlorosilane 2-(Diphenylphosphino)ethyltriethoxysilane (Heptafluoroisopropoxy)propylmethyldichlorosilane Bis(3-(triethoxysilyl)propyl)amine Bis-(3-(trimethoxysilyl)propyl)ethylenediamine Methylthioldimethylethoxysilane 3-Propylthioltrimethoxysilane 3-Propylthioltriethoxysilane 2-Ethylthioltriethoxysilane 3-Diethylaminopropyltrimethoxysilane N,N-Dimethyl-3-aminopropyltriethoxysilane 3-(2-Imidazolin-1-yl)propyltriethoxysilane N,N-Dibutyl-4-aminobutyltrimethoxysilane N-Hexyl-N-methyl-3-aminopropyltrimethoxysilane Ethylthiolmethyidiethoxysilane 6-Hexylthioltriethoxysilane 8-Octylthiolmethyidimethoxysi lane Bis(3-propylthiol)-diethoxysilane Methylthiolmethyldimethoxysilane Trimethylchlorosilane Diphenyldichlorosilane Bis(pentafluorophenyl)dichlorosilane Trioctylchlorosilane Ethyltrichlorosilane Methoxypropyltrimethoxysilane Triisopropylchlorosilane The support starting material is modified by suspending it in an appropriate solvent, such as pentane, hexane, heptane, toluene or dichloromethane, and slowly adding dropwise to this suspension a solution of the organo-silicon compound; the mixture is then left to react at the boiling temperature of the solvent for several hours. At room temperature the now modified support material is aftertreated by means of filtration, washing and drying. Drying takes place at from 20 to 140° C. and from 0.01 to 0.001 bar. The reaction temperature is preferably from −20 to +150° C., in particular from 40 to 150° C. The reaction time is from 1 to 36 hours, preferably 1–3 hours. It is preferred to operate in the equimolar range with respect to the content of reactive groups on the surface of the support material. The reaction is conducted under inert conditions.

To prepare the novel catalyst system, at least one support component is mixed with at least one metallocene component and with at least one cocatalyst component. In this context, the sequence of mixing of the various components is not important. It is preferred first of all to mix the metallocene component and the cocatalyst component with one another and then to mix the resulting cationic complex with the support component. Mixing takes place in an appropriate solvent such as pentane, heptane, toluene, dichloromethane or dichlorobenzene, in which the support component, which has been modified or rendered inert, is suspended, and a solution of the metallocene component and cocatalyst component is added dropwise or, preferably, such that up to 370% of the pore volume of the support component is added overall, in the form of a solution of the metallocene component and cocatalyst component, to the dry support component. The preparation of the novel catalyst system is conducted at from −20 to 150° C., preferably from 20 to 50° C., and with a contact time of between 15 minutes and 25 hours, preferably between 15 minutes and 5 hours. Solvent residues are removed under an oil pump vacuum.

The novel catalyst system is obtained with a metallocene content, preferably a zirconium content, of from 0.001 to 2 mmol Zr/$g_{support}$, preferably from 0.01 to 0.5 mmol Zr/$g_{support}$ and, with particular preference, from 0.01 to 0.1 mmol Zr/$g_{support}$. The ratio of cocatalyst to zirconium, preferably of boron to zirconium, is from 2:1 to 1:1.

In the novel catalyst system the transition metal compounds, for example a metallocene, and the cocatalyst are not bonded covalently to the support.

The present invention also provides a process for preparing a polyolefin by polymerizing one or more olefins in the presence of the novel catalyst system comprising at least one support which has been chemically modified or rendered inert. The term polymerization refers to both homopolymerization and copolymerization.

Preferably, olefins of the formula $R''$—CH=CH—$R^v$ are polymerized, in which $R''$ and $R^v$ are identical or different and are a hydrogen atom or a carbon-containing radical having 1 to 20 C atoms, in particular 1 to 10 C atoms, and $R''$ and $R^v$, together with the atoms linking them, can form one or more rings. Examples of such olefins are 1-olefins having 2 to 40, preferably 2 to 10 C atoms, such as ethylene, propene, 1-butene, 1-pentene, 1-hexene, 4-methyl-1-pentene or 1-octene, styrene, dienes, such as 1,3-butadiene, 1,4-hexadiene, vinylnorbornene or norbornadiene, and cyclic olefins, such as norbornene, tetracyclododecene or methylnorbornene. In the novel process it is preferred to homopolymerize ethene or propene or to copolymerize ethene with one or more 1-olefins having 3 to 20 C atoms, such as propene, and/or with one or more dienes having 4 to 20 C atoms, such as 1,4-butadiene or norbornadiene. Examples of such copolymers are ethene-propene copolymers and ethene-propene-1,4-hexadiene copolymers.

The polymerization is preferably conducted at a temperature from −60 to 250° C., particularly preferably from 50 to 200° C. The pressure is preferably from 0.5 to 2000 bar, particularly preferably from 5 to 64 bar.

The polymerization time is from 10 minutes to 10 hours, preferably from 30 minutes to 120 minutes.

The polymerization can be conducted in solution, in bulk, in suspension or in the gas phase, continuously or discontinuously and in one or more stages.

The catalyst system employed in the novel process preferably comprises one transition metal compound of the metallocene component. It is also possible to employ mixtures of two or more transition metal compounds of the metallocene component, for example for preparing polyolefins having a broad or multimodal molar mass distribution, and so-called reactor blends.

Using the novel catalyst system it is possible to carry out an initial polymerization, preferably using the (or one of the) olefin(s) employed in the polymerization proper.

The supported catalyst system can be resuspended as powder or, still mixed with solvent, in an inert suspension medium.

The suspension can be introduced into the polymerization system.

Before adding the novel supported catalyst system to the polymerization system it is advantageous to purify the olefin with an aluminum alkyl compound, for example trimethylaluminum, triethylaluminum, triisobutylaluminum, trioctylaluminum, isoprenylaluminum or aluminoxanes, in order to render the polymerization system inert (for example, to separate off catalyst poisons present in the olefin). Either this purification is conducted in the polymerization system itself, or before being added to the polymerization system the olefin is brought into contact with the Al compound and then separated again. If this purification is conducted in the polymerization system itself, the aluminum alkyl compound is added to the polymerization system in a concentration of from 0.01 to 100 mmol of Al per kg of reactor contents. It is preferred to employ triisobutylaluminum and triethylaluminum in a concentration of from 0.1 to 10 mmol of Al per kg of reactor contents.

As a molar mass regulator and/or to increase the activity, hydrogen is added if required. The overall pressure in the polymerization system is from 0.5 to 2500 bar, preferably from 2 to 1500 bar.

The catalyst system here is employed in a concentration, based on the transition metal, of preferably from $10^{-3}$ to $10^{-8}$, particularly preferably from $10^{-4}$ to $10^{-7}$, mol of transition metal per $dm^3$ of solvent or per $dm^3$ of reactor volume.

If the polymerization is conducted as a suspension or solution polymerization, use is made of an inert solvent which is customary for the Ziegler low-pressure process. The reaction is carried out, for example, in an aliphatic or cycloaliphatic hydrocarbon; examples of such that may be mentioned are propane, butane, hexane, heptane, isooctane, cyclohexane and methylcyclohexane. It is also possible to use a petroleum fraction or hydrogenated diesel oil fraction. Toluene can also be used. It is preferred to carry out polymerization in the liquid monomer.

If inert solvents are used, the monomers are metered in in gaseous or liquid form.

The duration of polymerization is arbitrary, since the catalyst system to be used in accordance with the invention shows only a slight decrease in polymerization activity over time.

The polymers prepared in accordance with the novel process are particularly suitable for producing shaped articles such as films, sheets or large hollow articles (e.g. pipes).

With the novel catalyst system, a catalyst activity of from 170 to 250 kg of PP/g of metallocene×h is achieved.

The invention is illustrated in more detail by way of examples.

EXAMPLES

General information: The organometallic compounds were prepared and handled in the absence of air and moisture under protection by argon (Schlenk technique). All solvents required were rendered absolute before use by boiling them for a number of hours over an appropriate drying agent and then carrying out distillation under argon. Spherical, porous support materials employed were silicas such as, for example, MS grades from PQ Corporation, ES or EP grades from Crosfield, or silica grades 948, 952, 955 from Grace Davisson, or similar grades.

The compounds were characterized by $^1$H-HMR, $^{13}$C-NMR and IR spectroscopy.

Example 1

1,4-Bis(dipentafluorophenylborane)-2,3,5,6-tetrafluoro-benzene 1.54 g (5 mmol) of dibromotetrafluorobenzene are dissolved in 40 ml of n-hexane and the solution is cooled to −78° C. 6.4 ml of n-BuLi (10 mmol) are added slowly dropwise to this solution, and the mixture is stirred for 1 h. Then 3.80 g (5 mmol) of bis(pentafluorophenyl)borylchloride are dissolved in 40 ml of n-hexane, and this solution is likewise added dropwise to the above solution. The suspension obtained is warmed slowly to room temperature, during which a white precipitate is deposited. This precipitate is separated off by filtration and the resulting filtrate is concentrated to dryness in vacuo. The yield of the resulting 1,4-bis(dipentafluorophenylboryl)-2,3,5,6-tetrafluorobenzene, which is obtained as a yellow oil, is 81%.

Example 2

Bis(dipentafluorophenylboryl)acetylene 1.06 g (5 mmol) of bis(chlorodimethylsilyl)acetylene are dissolved in 40 ml of n-hexane and the solution is cooled to −78° C. 3.80 g (10 mmol) of bis(pentafluorophenyl)boryl chloride in 40 ml of n-hexane are added slowly dropwise to this solution. The mixture is stirred at −78° C. for 1 h and then slowly warmed to RT. Solvent and dimethyldichlorosilane formed are removed under a high vacuum, the yellow oil which remains is then subjected to fractional distillation. This gives 2.2 g (61.7% yield) of bis-(dipentafluorophenylboryl)acetylene.

Example 3

[(Dipentafluorophenylboron)ethynyl]trimethylsilane 1.12 g (5 mmol) of (iodoethynyl)trimethylsilane are dissolved in 40 ml of tetrahydrofuran and the solution is cooled to −78° C. 3.2 ml of n-BuLi (5 mmol, 1.6 M in hexane) are added slowly dropwise to this solution and the mixture is stirred for 2 h. Then 1.90 g (5 mmol) of bis-(pentafluorophenyl)boryl chloride are dissolved in 40 ml of tetrahydrofuran and this solution is likewise added dropwise to the above solution. The suspension obtained is warmed slowly to room temperature, during which a white precipitate is deposited. This precipitate is separated off by filtration. The solvent is removed in vacuo from the resulting filtrate. The yellow oil which remains is subsequently subjected to fractional distillation. this gives 1.66 g (75% yield) of [(Dipentafluorophenylboron)ethynyl]trimethylsilane.

Example 4

[(Diphenylphosphino)ethynyl]dipentafluorophenylborane 1.05 g (5 mmol) of diphenylethynylphosphine are dissolved in 40 ml of diethyl ether and the solution is cooled to −78° C. 3.2 ml of n-BuLi (5 mmol, 1.6 M in hexane) are added slowly dropwise to this solution and the mixture is stirred for 2 h. The solution takes on a spontaneous red/brown coloration. Then 1.90 g (5 mmol) of bis (pentaflurophenyl)boryl chloride are dissolved in 40 ml of tetrahydrofuran and this solution is added dropwise to the above solution. The suspension obtained is warmed slowly to room temperature, during which a precipitate is deposited. This precipitate is separated off by filtration and the resulting filtrate is concentrated to dryness in vacuo. The yield of the resulting [(diphenylphosphino)ethynyl] dipentafluorophenylborane, which is obtained as an orange-colored oil, is 57%.

Example 5

Triphenylcarbenium [(dipentafluorophenylborane)-2,3,5,6-tetrafluorophenyl]tripentafluorophenylborate 0.62 g of bromopentafluorobenzene (2.5 mmol) are dissolved in 40 ml of diethyl ether, and 1.6 ml of n-BuLi (2.5 mmol, 1.6 M in hexane) are added at −78° C. The suspension is stirred at −10° C. for 1 h. Then 2.1 g (2.5 mmol) of 1,4-bis(dipentafluorophenylboryl)-2,3,5,6-tetrafluorobenzene in 40 ml of n-hexane are added slowly dropwise to the above solution. The suspension obtained is warmed slowly to room temperature, during which a precipitate is deposited. This precipitate is separated off by filtration, and the resulting filtrate is concentrated to dryness in vacuo. The resulting lithium salt is taken up in 40 ml of n-pentane, and 0.7 g (2.5 mmol) of triphenylmethyl chloride are added at room temperature. After stirring for 8 h, the orangercolored solid is filtered off. The filtrate is subjected to extraction in methylene chloride in order to separate off the LiCl which was formed. Precipitation with n-pentane gives an orange-colored solid (yield 56%).

Example 6

10 g of $SiO_2$ (MS 3030, from PQ, dried at 600° C. in a stream of argon) were suspended in 50 ml of toluene, and a solution of 100 mg (0.229 mmol) of dimethylsilanediylbis(2-methylindenyl)zirconium dimethyl and 128 mg (0.153 mmol) of 1,4-bis(dipentafluorophenylborane)-2,3,5,6-tetrafluorobenzene in 3 ml of toluene was added slowly, dropwise and with stirring. The mixture was stirred at room temperature for 1 h and then the solvent was removed under an oil pump vacuum to constant weight. For introduction into the polymerization system, 1 g of the supported catalyst was resuspended in 30 cm³ of EXXSOL™ which is a hydrocarbon manufactured by Exxon.

Polymerization:

In parallel with this, a dry 16 dm³ reactor was flushed first with nitrogen and then with propylene, and charged with 10 dm³ of liquid propylene. Then 0.5 cm³ of a 20% strength solution of triisobutylaluminum in VARSOL™ a hydrocarbon manufactured by Exxon, diluted with 30³ cm of EXXSOL™, was introduced into the reactor, and the batch was stirred at 30° C. for 15 minutes. Subsequently, the catalyst suspension was introduced into the reactor. The reaction mixture was heated to the polymerization temperature of 60° C. (4° C./min) and the polymerization system was held at 60° C. by cooling for 1 h. The polymerization was brought to an end by expelling the remaining propylene gas. The polymer was dried in a vacuum drying cabinet. This gave 1.4 kg of polypropylene powder. The reactor showed no deposits on the inner walls or stirrer. The catalyst activity was 144 kg of PP/g of metallocene×h.

Example 7

10 gof $SiO_2$ (MS 3030, from PQ, dried at 600° C. in a stream of argon) are added in portions to a solution of 100 mg (0.229 mmol) of dimethylsilanediylbis(2-methylindenyl)zirconium dimethyl and 143 mg (0.114 mmol) of triphenylcarbenium [(dipentafluorophenylborane-2,3,5,6-tetrafluorophenyl]triphenylfluorophenylboarate in 50 ml of toluene.The mixture was stirred at room temperature for 1 h and then the solvent was removed under an oil pump vacuum to constant weight. For introduction into the polymerization system, 1 g of the supported catalyst was resuspended in 30 cm³ of EXXSOL™.

Polymerization:

In parallel with this, a dry 16 dm³ reactor was flushed first with nitrogen and then with propylene, and charged with 10 dm³ of liquid propylene. Then 0.5 cm³ of a 20% strength solution of triisobutylaluminum in VARSOL™, diluted with 30³ cm of EXXSOL™, was introduced into the reactor, and the batch was stirred at 30° C. for 15 minutes. Subsequently, the catalyst suspension was introduced into the reactor. The reaction mixture was heated to the polymerization temperature of 60° C. (4° C./min) and the polymerization system was held at 60° C. by cooling for 1 h. The polymerization was brought to an end by expelling the remaining propylene gas. The polymer was dried in a vacuum drying cabinet. This gave 1.8 kg of polypropylene powder. The reactor showed no deposits on the inner walls or stirrer. The catalyst activity was 186 kg of PP/g of metallocene×h.

Example 8

1,4-Bis(dibromoboryl)-2,3,5,6-tetrafluorobenzene 4.44 g (20 mmol) of solid 1,4-bis(trimethylsilyl)-2,3,5,6-tetrafluorobenzene are added in proportions to 10 g(40 mmol) of $BBr_3$. The mixture is heated at 80° C. for 5 h. Then volatile $Me_3SiBr$ is removed using an oil pump. The resulting product is sufficiently pure to be reacted further directly. The yield is 76%.

Example 9

Bis(triphenylcarbenium)-1,4-bis {(tri[pentafluorophenyl])boryl}-2,3,5,6-tetrafluorobenzene 19 ml of n-BuLi (30 mmol) are added at −78° C. to 3.8 ml of bromopentafluorobenzene (30 mmol) in 50 ml of diethyl ether. The mixture is stirred at this temperature for 1 h. Then 2.5 g of 1,4-bis(dibromoboryl)-2,3,5,6-tetrafluorobenzene (5 mmol) are added in portions. The resulting suspension is heated slowly to room temperature, during which a precipitate is deposited. This precipitate is separated off by filtration, and the resulting filtrate is concentrated to dryness in vacuo. The dilithium salt thus obtained is taken up in 100 ml of pentane, and 2.8 g (10 mmol) of triphenylmethyl chloride are added at room temperature. After stirring for 8 hours, the orange/red solid is filtered off. The filtrate is subjected to extraction in methylene chloride in order to separate off the LiCl which has formed. Precipitation with n-pentane gives an orange/red solid (Yield 64%).

Example 10

Bis(N,N-dimethylanilinium)-1,4-bis {(tri[pentafluorophenyl])boryl}-2,3,5,6-tetrafluorobenzene 1.22 g of bromopentafluorobenzene (5 mmol) are dissolved in 40 ml of n-hexane and 3.2 ml (5 mmol) of n-BuLi are added at −78° C. The suspension is stirred at −78° C. for 1 h. Then 2.1 g of 1,4-bis(dipentafluorophenylboryl)-2,3,5,6-tetrafluorobenzene (2.5 mmol) in 40 ml of hexane are added dropwise to the above solution. The suspension obtained is warmed slowly to room temperature, during which a precipitate is deposited. This precipitate is separated off by filtration, and the resulting filtrate is concentrated to dryness in vacuo. The dilithium salt thus obtained is taken up in 40 ml of pentane, and 1,6 g of dimethylanilinium chloride are added at room temperature. After stirring for 8 h, the white solid is filtered off. The filtrate is subjected to extraction in methylene chloride in order to separate off the LiCl which has formed. Precipitation with pentane gives a white solid (Yield 67%).

Example 11

Rendering the Support Material Inert 10 g of $SiO_2$ (PQ MS 3030, from PQ Corporation, dried at 140° C. and 10 mbar) were admixed, slowly, dropwise and with stirring, with 40 ml of a 20% solution of trimethylaluminum in VARSOL™. Toluene was then added in an amount sufficient to produce a readily stirrable suspension. Stirring was continued for 10 minutes, and then the suspension was filtered to remove the solvent. The filter residue was subsequently washed twice with 35 ml of toluene. The support material pretreated in this way was dried at room temperature under an oil pump vacuum. This gave 18 g of inert support material.

Preparing the Supported Catalyst System 1.5 gof $SiO_2$ which had been rendered inert were suspended in 50 ml of toluene, and a solution of 20 mg (0.034 mmol) of dimethylsilanediylbis(2-methyl-4-phenylindenyl) zirconium dimethyl and 28 mg (0.034 mmol) of 1,4-bis (dipentafluorophenylborane)-2,3,5,6-tetrafluorobenzene in 6 ml of toluene were added slowly, dropwise and with stirring. The mixture was stirred slowly at room temperature for 2 h and then the solvent was removed to constant weight under an oil pump vacuum. For introduction into the polymerization system, the supported catalyst system was resuspended in 30 cm³ of isohexane.
Polymerization In parallel with this, a dry 16 dm³ reactor was flushed first with nitrogen and then with propylene and was charged with 10 dm³ of liquid propylene. Then 0.5 cm³ of a 20% solution of triisobutylaluminum in VARSOL™ diluted with 30 cm³ of EXXSOL™, was introduced into the reactor, and the batch was stirred at 30° C. for 15 minutes. Then the catalyst suspension was introduced into the reactor. The reaction mixture was heated to the polymerization temperature of 65° C. (4° C./min) and the polymerization system was held at 65° C. for 1 h by cooling. The polymerization was brought to an end by expelling the remaining propylene gas. The polymer was dried in a vacuum drying cabinet. This gave 1.8 kg of polypropylene powder. The reactor showed no deposits on the inner walls or stirrer. The catalyst activity was 120 kg of PP/g of metallocene×h. m.p.=159° C.

Example 12

Rendering the Support Material Inert 2 g of $SiO_2$ (PQ MS 3030, from PQ Corporation, dried at 140° C. and 10 mbar) were suspended in toluene and admixed, slowly, dropwise and with stirring, with 4 ml of a 20% solution of trimethylaluminum in Varsol. Stirring was continued for 30 minutes, and then the suspension was filtered to remove the solvent. The filter residue was subsequently washed twice with 10 ml of toluene. The support material pretreated in this way was dried at room temperature under an oil pump vacuum. This gave 2.7 g of inert support material.

Preparing the Supported Catalyst System 2 g of $SiO_2$ which have been rendered inert are added to a solution of 20 mg (0.034 mmol) of dimethylsilanediylbis (2-methyl-4-phenylindenyl)zirconium dimethyl and 57 mg (0.034 mmol) of bis[triphenylcarbenium][2,3,5,6-tetrafluorophenyl-1,4-bis(tri(pentafluorophenyl)borate)] in 15 ml of toluene. The mixture was stirred at room temperature for 12 h and then the solvent was removed to constant weight under an oil pump vacuum. For introduction into the polymerization system, the supported catalyst system was resuspended in 30 cm³ of isohexane.
Polymerization In parallel with this, a dry 16 dm³ reactor was flushed first with nitrogen and then with propylene and was charged with 10 dm³ of liquid propylene. Then 0.5 cm³ of a 20% solution of triisobutylaluminum in VARSOL™, diluted with 30 cm³ of EXXSOL™, was introduced into the reactor, and the batch was stirred at 30° C. for 15 minutes. Then the catalyst suspension was introduced into the reactor. The reaction mixture was heated to the polymerization temperature of 65° C. (4° C./min) and the polymerization system was held at 65° C. for 1 h by cooling. The polymerization was brought to an end by expelling the remaining propylene gas. The polymer was dried in a vacuum drying cabinet. This gave 2.7 kg of polypropylene powder. The reactor showed no deposits on the inner walls or stirrer. The catalyst activity was 135 kg of PP/g of metallocene×h. m.p.=160° C.

Example 13

Preparing the Supported Catalyst System 10 g of $SiO_2$ in analogy to Example B which have been rendered inert are added to a solution of 100 mg (0.170 mmol) of dimethylsilanediylbis(2-methyl-4-phenylindenyl) zirconium dimethyl and 142 mg (0.085 mmol) of bis [triphenylcarbenium][2,3,5,6-tetrafluorophenyl-1,4-bis(tri (pentafluorophenyl)borate)] in 50 ml of toluene. The mixture was stirred at room temperature for 4 h and then the solvent was removed to constant weight under an oil pump vacuum. For introduction into the polymerization system, 1 g of the supported catalyst was resuspended in 30 cm³ of isohexane.
Polymerization In parallel with this, a dry 16 dm³ reactor was flushed first with nitrogen and then with propylene and was charged with 10 dm³ of liquid propylene. Then 0.5 cm³ of a 20% solution of triisobutylaluminum in VARSOL™, diluted with 30 cm³ of EXXSOL™, was introduced into the reactor, and the batch was stirred at 30° C. for 15 minutes.

Then the catalyst suspension was introduced into the reactor. The reaction mixture was heated to the polymerization temperature of 65° C. (4° C./min) and the polymerization system was held at 65° C. for 1 h by cooling. The polymerization was brought to an end by expelling the remaining propylene gas. The polymer was dried in a vacuum drying cabinet. This gave 1.7 kg of polypropylene powder. The reactor showed no deposits on the inner walls or stirrer. The catalyst activity was 175 kg of PP/g of metallocene×h. m.p.=159° C.

Example 14

Rendering the Support Material Inert 10 g of $SiO_2$ (PQ MS 3030F, from PQ Corporation, dried at 140° C. and 10 mbar) were suspended in toluene and admixed, slowly, dropwise and with stirring, with 40 ml of a 20% solution of trimethylaluminum in VARSOL™. Stirring was continued for 30 minutes, and then the suspension was filtered to remove the solvent. The filter residue was subsequently washed twice with 10 ml of toluene. The support material pretreated in this way was dried at room temperature under an oil pump vacuum. This gave 2.7 g of inert support material.

Preparing the Supported Catalyst System 2 g of $SiO_2$ which have been rendered inert are added to a solution of 20 mg (0.034 mmol) of dimethylsilanediylbis (2-methyl-4-phenylin-denyl)zirconium dimethyl and 54 mg (0.068 mmol) of dimethylanilinium tetrakis (pentafluorophenyl)borate in 10 ml of toluene. The mixture was stirred at room temperature for 10 minutes and then the solvent was removed to constant weight under an oil pump vacuum. For introduction into the polymerization system, the supported catalyst system was resuspended in 30 $cm^3$ of isohexane.

Polymerization

In parallel with this, a dry 16 $dm^3$ reactor was flushed first with nitrogen and then with propylene and was charged with 10 $dm^3$ of liquid propylene. Then 0.5 $cm^3$ of a 20% solution of triisobutylaluminum in VARSOL™, diluted with 30 $cm^3$ of Exxsol, was introduced into the reactor, and the batch was stirred at 30° C. for 15 irninutes. Then the catalyst suspension was introduced into the reactor. The reaction mixture was heated to the polymerization temperature of 65° C. (40° C./min) and the polymerization system was held at 65° C. for 1 h by cooling. The polymerization was brought to an end by expelling the remaining propylene gas. The polymer was dried in a vacuum drying cabinet. This gave 2.5 kg of polypropylene powder. The reactor showed no deposits on the inner walls or stirrer. The catalyst activity was 125 kg of PP/g of metallocene×h. m.p.=161° C.

Example 15

Support Pretreatment 20 g of $SiO_2$ MS 3030 from PQ Corporation, dried at 100° C. in vacuo, were suspended in 200 ml of heptane. 56 mmol of triisobutylaluminum solution (as a 2-molar solution in Varsol) were added thereto at room temperature over the course of 30 minutes, under stirring and under argon, during which a temperature rise to 48° C. was observed. Stirring is continued overnight. The solid is filtered off and washed in each case 2× with 30 ml of heptane and then 1× with 30 ml of pentane. It is then dried to constant weight under an oil pump vacuum.

Preparation of the Supported Catalyst System 58.1 mg (0.122 mmol) of $Me_2Si(2-Me-Ind)2ZrCl_2$ were suspended in 50 ml of toluene, 2.5 mmol of triisobutylaluminum solution (as a 2-molar solution in VARSOL™) were added, the mixture was stirred for 10 minutes, and then 5 g of the above support material were added. Stirring was continued for 60 minutes. Solvent residues are then removed under an oil pump vacuum.

Polymerization:

In parallel with this, a dry 2 $dm^3$ autoclave was charged first with nitrogen and then with 10 g of Accurel from Akzo and also 200 ml of liquid propylene and 2.5 mmol of triisobutylaluminum solution (as a 2-molar solution in Varsol). Then 1.034 g of the supported catalyst followed by 0.030 mmol of 1,4-bis(dipentafluorophenylborane)-2,3,5,6-tetrafluorobenzene, dissolved in toluene, were introduced into the reactor. Polymerization was conducted without external heating for 30 minutes and then for a further 90 minutes at 65° C. and 25 bar. The polymerization was brought to an end by expelling the remaining propylene gas. The polymer was dried in a vacuum drying cabinet. This gives 250 g of polypropylene powder. The reactor showed no deposits on the internal walls or stirrer.

Example 16

Preparation of the Supported Catalyst System 3 g of $SiO_2$ which had been dehydrated at 800° C. were suspended in pentane, and 7.5 ml of 20% strength TEA solution were added. The support which had been rendered inert was isolated by decantation, six-fold washing with pentane, and removal of solvent residues in vacuo. The support was resuspended in toluene, and a solution of 200 mg of bis[triphenylcarbenium][2,3,5,6-tetrafluorophenyl-1,4-bis-(tri(pentafluorophenyl)borate)] in hot toluene was added. The toluene was then removed in vacuo to give a free-flowing powder which was taken up again in pentane and to which were added 48 mg of $Cp_2HfMe_2$ dissolved in pentane. After stirring for 15 minutes the solvent was removed in vacuo.

Polymerization

In parallel with this, a dry 1 $dm^3$ autoclave was first of all flushed with nitrogen. 300 ml of absolute hexane were introduced, and 100 mg of the above catalyst system, suspended in 100 ml of hexane, were added. Ethylene was injected to a pressure of 14 bar and polymerization was conducted at 60° C. After 20 minutes the autoclave was let down and cooled to room temperature and the resulting polymer was filtered off. The polymer was dried in a vacuum drying cabinet. This gave 121 g of polyethylene.

Example 17

Preparation of the Supported Catalyst System 1 g of $SiO_2$ was suspended in pentane, and 0.8 ml of 20% strength TEA solution was added. The support which had been rendered inert was isolated by decantation, two-fold washing with pentane, and removal of solvent residues in vacuo. The support was resuspended in toluene, and a solution of 63 mg of bis[triphenylcarbenium][2,3,5,6-tetrafluorophenyl-1,4-bis(tri(pentafluorophenyl)borate)] in hot toluene was added. The toluene was then removed in vacuo to give a free-flowing powder which was taken up again in pentane and to which were added 15 mg of rac-dimethylsilyl-bis(tetrahydroindenyl)zirconium dimethyl dissolved in pentane. After stirring for 15 minutes the solvent was removed in vacuo.

Polymerization:

In parallel with this, a dry 1 $dm^3$ autoclave was flushed first with nitrogen and then with propylene. 300 ml of liquid propylene were introduced and 912 mg of the above catalyst were added. The polymerization was conducted at 40° C. for 20 minutes. The polymerization was brought to an end by expelling the remaining propylene gas. The polymer was dried in a vacuum drying cabinet. This gave 378 g of polypropylene powder. The reactor showed no deposits on the internal walls or stirrer.

What is claimed is:

1. A supported catalyst composition comprising a support, at least one metallocene of 3, 4, 5 or 6 of the Periodic Table of the Elements, and at least one cocatalyst having the formula (II)

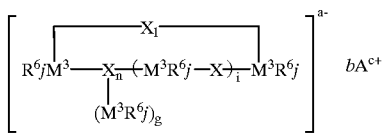

(II)

in which
- $R^6$ independently at each occurrence is identical or different and is a halogen atom or a $C_1$–$C_{40}$ carbon-containing group,
- X are, independently of one another, identical or different and are each a $C_1$–$C_{40}$ haloalkylene, $C_6$–$C_{40}$-arylene, $C_6$–$C_{40}$-haloarylene, $C_7$–$C_{40}$-arylalkylene, $C_7$–$C_{40}$-haloarylalkylene, $C_2$–$C_{40}$-alkenylene, $C_2$–$C_{40}$-haloalkynylene, $C_2$–$C_{40}$-alkelylene, $C_2$–$C_{40}$-alkenylene or $C_2$–$C_{40}$-haloalkenylene group,
- $M^3$ independently at each occurrence is identical or different and is an element of group 13 of the Periodic Table of the Elements,
- a is an integer from o to 10, b is an integer from 0 to 10, c is an integer from 0 to 10
- n is 0 or 1,
- l is 0 or 1,
- g is 0 or 1,
- i is 0 or 1,
- j is an integer from 1 to 6, and
- A is a cation of group 1, 2 or 13 of the Periodic Table of the Elements, a carbonium, oxonium or sulfonium cation, or a quaternary ammonium cation; and
- if a is 0 then b is 0 and the cocatalyst is neutral; if a is $\geqq 1$, then a=bc and then the cocatalyst is an anion with b cations $A^{c+}$ as counterions, and where said metallocene and cocatalyst are not bonded covalently to the support.

2. The supported catalyst composition as claimed in claim 1, wherein $R^6$ is a $C_1$–$C_{40}$-alkyl, $C_1$–$C_{40}$-haloalkyl, $C_6$–$C_{40}$-aryl, $C_6$–$C_{40}$-haloaryl-, $C_7$–$C_{40}$-arylalkyl or $C_7$–$C_{40}$-haloarylalkyl group.

3. The supported catalyst composition as claimed in claim 2, wherein X independently at each occurrence is identical or different and is a $C_1$–$C_{40}$-haloalkylene, $C_6$–$C_{40}$-haloarylene, $C_7$–$C_{40}$-arylalkylene, $C_7$–$C_{40}$-haloarylalkylene, $C_2$–$C_{40}$-alkynylene, $C_2$–$C_{40}$-haloalkynylene, $C_2$–$C_{40}$-alkenylene or $C_2$–$C_{40}$-haloalkenylene group, $C_1$–$C_{40}$-alkanetriyl, $C_1$–$C_{40}$-haloalkanetriyl, $C_6$–$C_{40}$-arenetriyl, $C_6$–$C_{40}$-haloarenetriyl, $C_7$–$C_{40}$-arenealkanetriyl, $C_7$–$C_{40}$-haloarenealkanetriyl, $C_2$–$C_{40}$-alkynetriyl, $C_2$–$C_{40}$-haloalkynetriyl, $C_2$–$C_{40}$-alkenetriyl or $C_2$–$C_{40}$-haloalkenetriyl group.

4. The supported catalyst as claimed in claim 3, wherein $R^6$ is trifluoromethyl, pentachloroethyl, heptafluoroisopropyl or monofluoroisobutyl, pentafluorophenyl, heptachloronaphthyl, heptafluoronaphthyl, heptafluorotolyl, 3,5-bis(trifluoromethyl)phenyl, 2,4,6-tris(trifluoromethyl)phenyl or 2,2-(octafluoro)biphenyl, and i is zero or one.

5. The supported catalyst system as claimed in claim 1, wherein said at least one transition metal compound is selected from the group consisting of
Bis(cyclopentadienyl)zirconium dimethyl,
Bis(indenyl)zirconium dimethyl,
Bis(fluorenyl)zirconium dimethyl,
(Indenyl)(fluorenyl)zirconium dimethyl,
(3-Methyl-5-naphthylindenyl)(2,7-di-tert-butylfluorenyl) zirconium dimethyl,
(3-Methyl-5-naphthylindenyl)(3,4,7-trimethoxyfluorenyl)zirconium dimethyl,
(Pentamethylcyclopentadienyl)(tetrahydroindenyl) zirconium dimethyl,
(Cyclopentadienyl)(1-octen-8-ylcyclopentadienyl) zirconium dimethyl,
(Indenyl)(1-buten-4-ylcyclopentadienyl)zirconium dimethyl,
[1,3-Bis(trimethylsilyl)cyclopentadienyl](3,4-fluorenyl) zirconium dimethyl,
Bis(cyclopentadienyl)titanium dimethyl,
Dimethylsilanediylbis(indenyl)zirconium dimethyl,
Dimethylsilanediylbis(fluorenyl)zirconium dimethyl,
Dimethylsilanediylbis(tetrahydroindenyl)zirconium dimethyl,
Dimethylsilanediyl(cyclopentadienyl)(indenyl)zirconium dimethyl,
Dimethylsilanediyl(cyclopentadienyl)(fluorenyl) zirconium dimethyl,
Dimethylsilanediylbis(2-methylindenyl)zirconium dimethyl,
Dimethylsilanedlylbis(2-ethylindenyl)zirconium dimethyl,
Dimethylsilanediylbis(2-methyl-4,5-benzoindenyl) zirconium dimethyl,
Dimethylsilanediylbis(2-methyl-5,6-benzoindenyl) zirconium dimethyl,
Dimethylsilanediylbis(2-ethyl-4,5-benzoindenyl) zirconium dimethyl,
Dimethylsilanediylbis(4,5-dihydro-8-methyl-7H-cyclopenten[e]acenaphthylen-7-ylidene)zirconium dimethyl,
Dimethylsilanediylbis(2-ethyl-4,5-benzoindenyl)(2-ethyl-4-phenylindenyl)-zirconium dimethyl,
Dimethylsilanediyl(2-methyl-4,5-benzoindenyl)(2-ethyl-4-phenylindenyl)-zirconium dimethyl,
Dimethylsilanediyl(2-ethyl-4,5-benzoindenyl)(2-ethyl-4-naphthylindenyl)-zirconium dimethyl,
Dimethylsilanediyl(2-methylindenyl)(4-phenylindenyl) zirconium dimethyl,
Dimethylsilanediylbis(2-methyl-4-phenylindenyl) zirconium dimethyl,
Dimethylsilanediylbis(2-ethyl-4-phenylindenyl) zirconium dimethyl,
Dimethylsilanediylbis(2-methyl-4,6-diisopropylindenyl) zirconium dimethyl,
Dimethylsilanediylbis(2-ethyl-4,6-diisopropylindenyl) zirconium dimethyl,
Dimethylsilanediylbis(2-methyl-4-(1)-naphthyl)indenyl) zirconium dimethyl,
Dimethylsilanediylbis(2-methyl-4-(2)-naphthyl)indenyl) zirconium dimethyl,
Dimethylsilanediylbis(2-ethyl-4-(1)-naphthylindenyl) zirconium dimethyl,
Dimethylsilanediylbis(2-ethyl-4-(2)-naphthylindenyl) zirconium dimethyl,
Dimethylsilanediylbis(2-trimethylsilylindenyl)zirconium dimethyl,
Dimethylsilanediylbis(4-(1)-naphthylindenyl)zirconium dimethyl,
Dimethylsilanediylbis(2-methyl-4t-butylindenyl) zirconium dimethyl, Dimethylsilanediylbis(2-methyl-4-isopropylindenyl)zirconium dimethyl,
Dimethylsilanediylbis(2-ethylindenyl)zirconium dimethyl,
Dimethylsilanediylbis(2,4-diethylindenyl)zirconium dimethyl,
Dimethylsilanediylbis(2,4-dimethylindenyl)zirconium dimethyl,
Dimethylsilanediylbis(2-methyl-5-fluorenylindenyl)zirconium dimethyl,
Dimethylsilanediylbis(2,4,6-trimethylindenyl)zirconium dimethyl,
Dimethylsilanediylbis(2,5,6-trimethylindenyl)zirconium dimethyl,
Dimethylsilanediylbis(2,4,7-trimethylindenyl)zirconium dimethyl,
Dimethylsilanediylbis(2-methyl-5-t-butylindenyl)zirconium dimethyl,
Diphenylsilanediylbis(indenyl)zirconium dimethyl,
Diphenylsilanediylbis(fluorenyl)zirconium dimethyl,
Diphenylsilanediylbis(tetrahydroindenyl)zirconium dimethyl,
Diphenylsilanediyl(cyclopentadienyl)(indenyl)zirconium dimethyl,
Diphenylsilanediyl(cyclopentadienyl)(fluorenyl)zirconium dimethyl,
Diphenylsilanediylbis(2-methylindenyl)zirconium dimethyl,
Diphenylsilanediylbis(2-methyl-4,5-benzoindenyl)zirconium dimethyl,
Diphenylsilanediylbis(2-ethyl-4,5-benzoindenyl)zirconium dimethyl,
Diphenylsilanediylbis(4,5-dihydro-8-methyl-7H-cyclopent[e]acenaphthylen-7-ylidene)zirconium dimethyl,
Diphenylsilanediyl(2-methyl-4,5-benzoindenyl)(2-ethyl-4-phenylindenyl)-zirconium dimethyl,
Diphenylsilanediyl(2-ethyl-4,5-benzoindenyl)(2-ethyl-4-naphthylindenyl)-zirconium dimethyl,
Diphenylsilanediyl(2-methylindenyl)(4-phenylindenyl)zirconium dimethyl,
Diphenylsilanediylbis(2-methyl-4-phenylindenyl)zirconium dimethyl,
Diphenylsilanediylbis(2-ethyl-4-phenylindenyl)zirconium dimethyl,
Diphenylsilanediylbis(2-methyl-4,6-diisopropylindenyl)zirconium dimethyl,
Diphenylsilanediylbis(2-ethyl-4,6-diisopropylindenyl)zirconium dimethyl,
Diphenyisilanediylbis(2-methyl-4-(1)-naphthyl)indenyl)zirconium dimethyl,
Diphenylsilanediylbis(2-ethyl-4-(1)-naphthylindenyl)zirconium dimethyl,
Diphenylsilanediylbis(2-trimethylsilylindenyl)zirconium dimethyl,
Diphenylsilanediylbis(4-(1)-naphthylindenyl)zirconium dimethyl,
Diphenylsilanediylbis(2-methyl-4-t-butylindenyl)zirconium dimethyl,
Diphenylsilanediylbis(2-ethylindenyl)zirconium dimethyl,
Diphenylsilanediylbis(2,4-dimethylindenyl)zirconium dimethyl,
Diphenylsilanediylbis(2-methyl-5-fluorenylindenyl)zirconium dimethyl,
Diphenylsilanediylbis(2,4,6-trimethylindenyl)zirconium dimethyl,
Diphenylsilanediylbis(2-methyl-5-t-butylindenyl)zirconium dimethyl,
Methylphenylsilanediylbis(indenyl)zirconium dimethyl,
Methylphenylsilanediylbis(fluorenyl)zirconium dimethyl,
Methylphenylsilanediylbis(tetrahydroindenyl)zirconium dimethyl,
Methylphenylsilanediyl(cyclopentadienyl)(indenyl)zirconium dimethyl,
Methylphenylsilanediyl(cyclopentadienyl)(fluorenyl)zirconium dimethyl,
Methylphenylsilanediylbis(2-methylindenyl)zirconium dimethyl,
Methylphenylsilanediylbis(2-methyl-4,5-benzoindenyl)zirconium dimethyl,
Methylphenylsilanediylbis(2-ethyl-4,5-benzoindenyl)zirconium dimethyl,
Methylphenylsilanediylbis(4,5-dihydro-8-methyl-7H-cyclopent[e]-acenaphthylen-7-ylidene)zirconium dimethyl,
Methylphenylsilanediyl(2-methyl-4,5-benzoindenyl)(2-ethyl-4-phenyl-indenyl)zirconium dimethyl,
Methylphenylsilanediyl(2-ethyl-4,5-benzoindenyl)(2-ethyl-4-naphthyl-indenyl)zirconium dimethyl,
Methylphenylsilanediyl(2-methylindenyl)(4-phenylindenyl)zirconium dimethyl,
Methylphenylsilanediylbis(2-methyl-4-phenylindenyl)zirconium dimethyl,
Methylphenylsilanediylbis(2-ethyl-4-phenylindenyl)zirconium dimethyl,
Methylphenylsilanediylbis(2-methyl-4,6-diisopropylindenyl)zirconium dimethyl,
Methylphenylsilanediylbis(2-ethyl-4,6-diisopropylindenyl)zirconium dimethyl,
Methylphenylsilanediylbis(2-methyl-4-(1)-naphthyl)indenyl)zirconium dimethyl,
Methylphenylsilanediylbis(2-ethyl-4-(1)-naphthylindenyl)zirconium dimethyl,
Methylphenylsilanediylbis(2-trimethylsilylindenyl)zirconium dimethyl,
Methylphenylsilanediylbis(4-(1)-naphthylindenyl)zirconium dimethyl,
Methylphenylsilanediylbis(2-methyl-4-t-butylindenyl)zirconium dimethyl,
Methylphenylsilanediylbis(2-ethylindenyl)zirconium dimethyl,
Methylphenylsilanediylbis(2,4-dimethylindenyl)zirconium dimethyl,
Methylphenylsilanediylbis(2-methyl-5-fluorenylindenyl)zirconium dimethyl,
Methylphenylsilanediylbis(2,4,6-trimethylindenyl)zirconium dimethyl,
Methylphenylsilanediylbis(2-methyl-5-t-butylindenyl)zirconium dimethyl,
Ethylene-1,2-bis(indenyl)zirconium dimethyl,
Ethylene-1,2-bis(fluorenyl)zirconium dimethyl, Ethylene-1,2-bis(tetrahydroindenyl)zirconium dimethyl,
Ethylene-1,2-(cyclopentadienyl)(indenyl)zirconium dimethyl,
Ethylene-1,2-(cyclopentadienyl)(fluorenyl)zirconium dimethyl,
Ethylene-1,2-bis(2-methylindenyl)zirconium dimethyl,
Ethylene-1,2-bis(2-methyl-4,5-benzoindenyl)zirconium dimethyl,
Ethylene-1,2-bis(2-ethyl-4,5-benzoindenyl)zirconium dimethyl,
Ethylene-1,2-bis(4,5-dihydro-8-methyl-7H-cyclopent[e]acenaphthylen-7-ylidene)zirconium dimethyl,
Ethylene-1,2-(2-methyl-4,5-benzoindenyl)(2-ethyl-4-phenylindenyl)-zirconium dimethyl,
Ethylene-1,2-(2-ethyl-4,5-benzoindenyl)(2-ethyl-4-naphthylindenyl)-zirconium dimethyl,
Ethylene-1,2-(2-methylindenyl)(4-phenylindenyl)zirconium dimethyl,
Ethylene-1,2-bis(2-methyl-4-phenylindenyl)zirconium dimethyl,
Ethylene-1,2-bis(2-ethyl-4-phenylindenyl)zirconium dimethyl,
Ethylene-1,2-bis(2-methyl-4,6-diisopropylindenyl) zirconium dimethyl,
Ethylene-1,2-bis(2-ethyl-4,6-diisopropylindenyl) zirconium dimethyl,
Ethylene-1,2-bis(2-methyl-4-(1)-naphthyl)indenyl) zirconium dimethyl,
Ethylene-1,2-bis(2-ethyl-4-(1-)-naphthylindenyl) zirconium dimethyl,
Ethylene-1,2-bis(2-trimethylsilylindenyl)zirconium dimethyl,
Ethylene-1,2-bis(4-(1)-naphthylindenyl)zirconium dimethyl,
Ethylene-1,2-bis(2-methyl-4-t-butylindenyl)zirconium dimethyl,
Ethylene-1,2-bis(2-ethylindenyl)zirconium dimethyl,
Ethylene-1,2-bis(2,4-dimethylindenyl)zirconium dimethyl,
Ethylene-1,2-bis(2-methyl-5-fluorenylindenyl)zirconium dimethyl,
Ethylene-1,2-bis(2,4,6-trimethyl indenyl)zirconium dimethyl,
Ethylene-1,2-bis(2-methyl-5-t-butylindenyl)zirconium dimethyl,
1-Silacyclopentane-1,1-bis(indenyl)zirconium dimethyl,
1-Silacyclopentane-1,1-bis(2-methylindenyl)zirconium dimethyl,
1-Silacyclopentane-1,1-bis(2-ethylindenyl)zirconium dimethyl,
1-Silacyclopentane-1,1-bis(2-methyl-4,5-benzoindenyl) zirconium dimethyl,
1-Silacyclopentane-1,1-bis(2-ethyl-4,5-benzoindenyl) zirconium dimethyl,
1-Silacyclopentane-1-(2-ethyl-4,5-benzoindenyl)-1-(2-methyl-4-phenyl-indenyl)zirconium dimethyl,
1-Silacyclopentane-1,1-bis(2-methyl-4-phenylindenyl) zirconium dimethyl,
1-Silacyclopentane-1,1-bis(2-ethyl-4-phenylindenyl) zirconium dimethyl,
1-Silacyclopentane-1,1-bis(2-methyl-4,6-diisopropylindenyl)zirconium dimethyl,
1-Silacyclopentane-1,1-bis(2-methyl-4-naphthylindenyl)zirconiumdimethyl, 1-Silacyclopentane-1,1-bis(2-ethyl-4-naphthylindenyl)zirconium dimethyl,
Propylene-2,2-bis(indenyl)zirconium dimethyl,
Propylene-2-cyclopentadienyl-2-(1-indenyl)zirconium dimethyl,
Propylene-2-cyclopentadienyl-2-(4-phenyl-1-indenyl) zirconium dimethyl,
Propylene-2-cyclopentadienyl-2-(9-fluorenyl)zirconium dimethyl,
Propylene-2-cyclopentadienyl-2-(2,7-dimethoxy-9-fluorenyl)zirconium dimethyl,
Propylene-2-cyclopentadienyl-2-(2,7-di-tert-butyl-9-fluorenyl)zirconium dimethyl,
Propylene-2-cyclopentadienyl-2-(2,7-dibromo-9-fluorenyl)zirconium dimethyl,
Propylene-2-cyclopentadienyl-2-(2,7-diphenyl-9-fluorenyl)zirconium dimethyl,
Propylene-2-cyclopentadienyl-2-(2,7-dimethyl-9-fluorenyl)zirconium dimethyl,
Propylene-2-(3-methylcyclopentadienyl)-2-(2,7-dibutyl-9-fluorenyl)-zirconium dimethyl,
Propylene-2-(3-tert-butylcyclopentadienyl)-2-(2,7-dibutyl-9-fluorenyl)-zirconium dimethyl,
Propylene-2-(3-trimethylsilylcyclopentadienyl)-2-(3,6-di-tert-butyl-9-fluorenyl)zirconium dimethyl,
Propylene-2-cyclopentadienyl-2-[2,7-bis(3-buten-1-yl)-9-fluorenyl]-zirconium dimethyl,
Propylene-2-cyclopentadienyl-2-(3-tert-butyl-9-fluorenyl)zirconium dimethyl,
Propylene-2,2-bis(tetrahydroindenyl)zirconium dimethyl,
Propylene-2,2-bis(2-methylindenyl)zirconium dimethyl,
Propylene-2,2-bis(2-ethylindenyl)zirconium dimethyl,
Propylene-2,2-bis(2-methyl-4,5-benzoindenyl)zirconium dimethyl,
Propylene-2,2-bis(2-ethyl-4,5-benzoindenyl)zirconium dimethyl,
Propylene-2,2-bis(4,5-dihydro-8-methyl-7H-cyclopent[e]acenaphthylen-7-ylidene)zirconium dimethyl,
Propylene-2-(2-methyl-4, 5-benzoindenyl)-2-(2-methyl-4-phenyl indenyl)-zirconium dimethyl,
Propylene-2-(2-methylindenyl)-2-(4-phenylindenyl) zirconium dimethyl,
Propylene-2,2-bis(2-methyl-4-phenylindenyl)zirconium dimethyl,
Propylene-2,2-bis(2-ethyl-4-phenylindenyl)zirconium dimethyl,
Propylene-2,2-bis(2-methyl-4,6-diisopropylindenyl) zirconium dimethyl,
Propylene-2,2-bis(2-methyl-4-naphthylindenyl) zirconium dimethyl,
Propylene-2,2-bis(2-ethyl-4-naphthylindenyl)zirconium dimethyl,
1,6-Bis[methylsilylbis(2-methyl-4-phenylindenyl) zirconium dimethyl]hexane,
1,6-Bis[methylsilylbis(2-methyl-4,5-benzoindenyl) zirconium dimethyl]hexane,
1,6-Bis[methylsilylbis(2-ethyl-4-phenylindenyl) zirconium dimethyl]hexane,
1,6-Bis[methylsilylbis(2-methyl-4-naphthylindenyl) zirconium dimethyl]hexane, 1,6-Bis[methylsilylbis(2-methyl-4,6-diisopropylindenyl) zirconium dimethyl]hexane, 1,6-Bis[methylsilyl(2-methyl-4-phenylindenyl)(4,5-benzoindenyl)zirconium dimethyl]hexane, 1-[Methylsilylbis(tetrahydroindenyl)zirconium dimethyl]-6-[ethylstannyl-(cyclopentadienyl) (fluorenyl)zirconium dimethyl]hexane, 1,6-Disila-1,1,6,6-tetramethyl-1,6-bis[methylsilylbis(2-methyl-4-phenyl-indenyl)zirconium dimethyl]hexane, 1,4-Disila-1,4-bis[methylsilylbis(2-methyl-4-phenylindenyl)zirconium dimethyl]cyclohexane,

[1,4-Bis(1-indenyl)-1,1,4,4-tetramethyl-1,4-disilabutane] bis(pentamethylcyclopentadienylzirconium dimethyl),

[1,4-Bis(9-fluorenyl)-1,1,4,4-tetramethyl-1,4-disilabutane]bis(cyclopenta-dienylzirconium dimethyl),

[1,4-Bis(1-indenyl)-1,1,4,4-tetramethyl-1,4-disilabutane] bis(cyclopenta-dienylzirconium dimethyl),

[1-(1-indenyl)-6-(2-phenyl-1-indenyl)-1,1,6,6-tetraethyl-1,6-disila-4-oxa-hexane]bis(tert-butylcyclopentadienylzirconium dimethyl),

[1,10-Bis(2,3-dimethyl-1-indenyl)-1,1,10,10-tetramethyl-1,10-digermadecane]bis(2-methyl-4-phenylindenylzirconium dimethyl), (1-Methyl-3-tert-butylcyclopentadienyl)(1-phenyl-4-methoxy-7-chlorofluorenyl)zirconium dimethyl, (4,7-Dichloroindenyl)(3,6-dimesitylfluorenyl)zirconium dimethyl, Bis(2,7-di-tert-butyl-9-cyclohexylfluorenyl)zirconium dimethyl, (2,7-Dimesitylfluorenyl)[2,7-bis(1-naphthyl)fluorenyl] zirconium dimethyl, Dimethylsilylbis(fluorenyl)zirconium dimethyl, Dibutylstannylbis(2-methylfluorenyl)zirconium dimethyl, 1,1,2,2-Tetraethyldisilanediyl(2-methylindenyl)(4-phenylfluorenyl)zirconium dimethyl, Propylene-1-(2-indenyl)-2-(9-fluorenyl)zirconium dimethyl, 1,1-Dimethyl-1-silaethylenebis(fluorenyl)zirconium dimethyl,

[4-(Cyclopentadienyl)-4,7,7-trimethyl (tetrahydroindenyl)]zirconium dimethyl,

[4-(Cyclopentadienyl)-4,7-dimethyl-7-phenyl(5,6-dimethyltetrahydro-indenyl)]zirconium dimethyl,

[4-(Cyclopentadienyl)-4,7-dimethyl-7-(1-naphthyl)(7-phenyltetrahydro-indenyl)]zirconium dimethyl,

[4-(Cyclopentadienyl)-4,7-dimethyl-7-butyl(6,6-diethyltetrahydroindenyl)]-zirconium dimethyl,

[4-(3-tert-Butylcyclopentadienyl)-4,7,7-trimethyl (tetrahydroindenyl)]-zirconium dimethyl

[4-(1-Indenyl)-4,7,7-trimethyl(tetrahydroindenyl)] zirconium dimethyl,

Bis(cyclopentadienyl)titanium dimethyl,

Bis(cyclopentadienyl)hafnium dimethyl,

Bis(indenyl)vanadium dimethyl,

Bis(fluorenyl)scandium dimethyl, (Indenyl)(fluorenyl)niobium dimethyl, (2-Methyl-7-naphthylindenyl)(2,6-di-tert-butylfluorenyl) titanium dimethyl, (Pentamethylcyclopentadienyl)(tetrahydroindenyl) hafnium bromide methyl, (Cyclopentadienyl)(1-octen-8-ylcyclopentadienyl) hafnium dimethyl, (Indenyl)(2-buten-4-ylcyclopentadienyl)titanium dimethyl,

[1,3-Bis(trimethylsilyl)cyclopentadienyl](3,4-benzofluorenyl)niobium dimethyl,

Dimethylsilanediylbis(indenyl)titanium dimethyl,

Dimethylsilanediylbis(tetrahydroindenyl)hafnium dimethyl,

Dimethylsilanediyl(cyclopentadienyl)(indenyl)titanium dimethyl,

Dimethylsilanediylbis(2-methylindenyl)hafnium dimethyl,

Dimethylsilanediylbis(2-ethylindenyl)scandium methyl,

Dimethylsilanediylbis(2-butyl-4,5-benzoindenyl) niobium dimethyl,

Dimethylsilanediylbis(2-ethyl-4,5-benzoindenyl)titanium dimethyl,

Dimethylsilanediylbis(4,5-dihydro-8-methyl-7H-cyclopent[e]acenaphthylen-7-ylidene)titanium dimethyl, Dimethylsilanediyl(2-methyl-4,5-benzoindenyl)(2-methyl-4-phenylindenyl)titanium dimethyl, Dimethylsilanedlyl(2-ethyl-4,5-benzoindenyl)(2-methyl-4-phenylindenyl)hafnium dimethyl, Dimethylsilanediyl(2-methyl-4,5-benzoindenyl)(2-ethyl-4-phenylindenyl)scandium methyl, Dimethylsilanediyl(2-ethyl-4,5-benzoindenyl)(2-ethyl-4-naphthylindenyl)titanium dimethyl, Dimethylsilanediyl(2-methylindenyl)(4-phenylindenyl) hafnium dimethyl, Dimethylsilanediylbis(2-methyl-4-phenylindenyl) niobium dimethyl, Dimethylsilanediylbis(2-ethyl-4-phenylindenyl) vanadium dimethyl, Dimethylsilanediylbis(2-methyl-4,6-diisopropylindenyl) hafnium dimethyl, Dimethylsilanediylbis(2-ethyl-4,6-diisopropyindenyl) vanadium dimethyl, Dimethylsilanediylbis(2-methyl-4-naphthylindenyl) hafnium bromide methyl, Dimethylsilanediylbis(2-ethyl-4-naphthylindenyl) titanium dimethyl, Methylphenylsilanediylbis(indenyl)titanium dimethyl, Methylphenylsilanediyl(cyclopentadienyl)(indenyl) hafnium dimethyl, Methylphenylsianediylbis(tetrahydroindenyl)hafnium dimethyl, Methylphenylsilanediylbis(2-methylindenyl)titanium dimethyl, Methylphenylsilanediylbis(2-ethylindenyl)hafnium dimethyl, Methylphenylsilanediylbis(2-methyl-4,5-benzoindenyl) hafnium dimethyl, Methylphenylsilanediylbis(2-ethyl-4,5-benzoindenyl) vanadium dimethyl, Dimethylsilanediylbis(4,5-dihydro-8-methyl-7H-cyclopent[e]ace-naphthylen-7-ylidene)titanium dimethyl, Methylphenylsilanediyl(2-methyl-4,5-benzoindenyl)(2-methyl-4-phenyl-indenyl)titanium bromide methyl, Methylphenylsilanediyl(2-methyl-4,5-benzoindenyl)(2-methyl-4-phenylindenyl)titanium dimethyl,
Methylphenylsilanediyl(2-methyl-4,5-benzoindenyl)(2-ethyl-4-phenylindenyl)hafnium dimethyl,
Methylphenylsilanediyl(2-methyl-4,5-benzoindenyl)(2-methyl-4-naphthylindenyl)hafnium dimethyl,
Methylphenylsilanediyl(2-methylindenyl)(4-phenylindenyl)titanium dimethyl,
Methylphenylsilanediylbis(2-methyl-4-phenylindenyl)hafnium dimethyl,
Methylphenylsilanediylbis(2-ethyl-4-phenylindenyl)vanadium dimethyl,
Methylphenylsilanediylbis(2-methyl-4,6-diisopropylindenyl)titanium dimethyl,
Methylphenylsilanediylbis(2-ethyl-4,6-diisopropylindenyl)hafnium dimethyl,
Methylphenylsilanediylbis(2-methyl-4-naphthylindenyl)hafnium dimethyl,
Methylphenylsilanediylbis(2-ethyl-4-naphthylindenyl)titanium dimethyl,
Diphenylsilanediylbis(indenyl)titanium dimethyl,
Diphenylsilanediylbis(2-methylindenyl)hafnium dimethyl,
Diphenylsilanediylbis(2-ethylindenyl)titanium dimethyl,
Diphenylsilanediyl(cyclopentadienyl)(indenyl)hafnium dimethyl,
Diphenylsilanediylbis(2-methyl-4,5-benzoindenyl)titanium dimethyl,
Diphenylsilanediylbis(2-ethyl-4,5-benzoindenyl)hafnium dimethyl,
Diphenylsilanediyl(2-methyl-4,5-benzoindenyl)(2-methyl-4-phenylindenyl)-hafnium dimethyl,
Diphenylsilanediyl(2-ethyl-4,5-benzoindenyl)(2-methyl-4-phenylindenyl)-titanium dimethyl,
Diphenylsilanediyl(2-methyl-4,5-benzoindenyl)(2-ethyl-4-phenylindenyl)-hafnium dimethyl,
Diphenylsilanediyl(2-ethyl-4,5-benzoindenyl)(2-ethyl-4-naphthylindenyl)-titanium dimethyl,
Diphenylsilanediyl(2-methylindenyl)(4-phenylindenyl)titanium dimethyl,
Diphenylsilanediylbis(2-methyl-4-phenylindenyl)titanium dimethyl,
Diphenylsilanediylbis(2-ethyl-4-phenylindenyl)hafnium dimethyl
Diphenylsilanediylbis(2-methyl-4,6-diisopropylindenyl)hafniumdimethyl,
Diphenylsilanediylbis(2-ethyl-4,6-diisopropylindenyl)hafnium dimethyl,
Diphenylsilanediylbis(2-methyl-4-naphthylindenyl)hafnium dimethyl,
Diphenylsilanediylbis(2-ethyl-4-naphthylindenyl)titanium dimethyl,
1-Silacyclopentane-1,1-bis(indenyl)hafnium dimethyl,
1-Silacyclopentane-1,1-bis(2-methylindenyl)hafnium dimethyl,
1-Silacyclopentane-1,1-bis(2-ethylindenyl)hafnium dimethyl,
1-Silacyclopentane-1,1-bis(2-methyl-4,5-benzoindenyl)titanium dimethyl,
1-Silacyclopentane-1-bis(2-ethyl-4,5-benzoindenyl)hafnium dimethyl,
1-Silacyclopentane-1-(2-methyl-4,5-benzoindenyl)-1-(2-methyl-4-phenyl-indenyl)scandium methyl,
1-Silacyclopentane-1-(2-ethyl-4,5-benzoindenyl)-1-(2-methyl-4-phenyl-indenyl)hafnium dimethyl,
1-Silacyclopentane-1-(2-methyl-4,5-benzoindenyl)-1-(2-ethyl-4-phenyl-indenyl)titanium dimethyl
1-Silacyclopentane-1-(2-ethyl-4,5-benzoindenyl)-1-(2-ethyl-4-naphthyl-indenyl)hafnium dimethyl,
1-Silacyclopentane-1-(2-methylindenyl)-1-(4-phenylindenyl)hafnium dimethyl
1-Silacyclopentane-1,1-bis(2-methyl-4-phenylindenyl)hafnium dim ethyl,
1-Silacyclopentane-1,1-bis(2-ethyl-4-phenylindenyl)titanium bromide methyl,
1-Silacyclopentane-1,1-bis(2-methyl-4,6-diisopropylindenyl)titanium dimethyl,
1-Silacyclopentane-1,1-bis(2-ethyl-4,6-diisopropylindenyl)titanium dimethyl,
1-Silacyclopentane-1,1-bis(2-methyl-4-naphthylindenyl)scandium methyl,
1-Silacyclopentane-1,1-bis(2-ethyl-4-naphthylindenyl)hafnium dimethyl,
Bis(cyclopentadienyl)titanium dimethyl,
Ethylene-1,2-bis(indenyl)scandium methyl,
Ethylene-1,2-bis(tetrahydroindenyl)titanium dimethyl,
Ethylene-1-cyclopentadienyl-2-(1-indenyl)hafnium dimethyl,
Ethylene-1-cyclopentadienyl-2-(2-indenyl)titanium bromide methyl,
Ethylene-1-cyclopentadienyl-2-(2-methyl-1-indenyl)hafnium dimethyl,
Ethylene-1,2-bis(2-methylindenyl)hafnium dimethyl,
Ethylene-1,2-bis(2-ethylindenyl)hafnium dimethyl,
Ethylene-1,2-bis(2-methyl-4,5-benzoindenyl)hafnium dimethyl,
Ethylene-1,2-bis(2-ethyl-4,5-benzoindenyl)titanium dimethyl,
Ethylene-1,2-bis(4,5-dihydro-8-methyl-7H-cyclopent[e]acenaphthylen-7-ylidene)titanium dimethyl,
Ethylene-1-(2-methyl-4,5-benzoindenyl)-2-(2-methyl-4-phenylindenyl)-titanium dimethyl,
Ethylene-1-(2-ethyl-4,5-benzoindenyl)-2-(2-methyl-4-phenylindenyl)titanium dimethyl,
Ethylene-1-(2-methyl-4,5-benzoindenyl)-2-(2-ethyl-4-phenylindenyl)-scandium methyl,
Ethylene-1-(2-ethyl-4,5-benzoindenyl)-2-(2-ethyl-4-naphthylindenyl)-hafnium dimethyl,
Ethylene-1-(2-methylindenyl)-2-(4-phenylindenyl)titanium dimethyl,
Ethylene-1,2-bis(2-methyl-4-phenylindenyl)hafnium dimethyl,
Ethylene-1,2-bis(2-ethyl-4-phenylindenyl)hafnium dimethyl,
Ethylene-1,2-bis(2-methyl-4,6-diisopropylindenyl)hafnium dimethyl,
Ethylene-1,2-bis(2-ethyl-4,6-diisopropylindenyl)titanium dimethyl,
Ethylene-1,2-bis(2-methyl-4-naphthylindenyl)titanium dimethyl
Ethylene-1,2-bis(2-ethyl-4-naphthylindenyl)hafnium dimethyl, Propylene-2,2-bis(indenyl)hafnium dimethyl,
Propylene-2-cyclopentadienyl-2-(1-indenyl)titanium dimethyl,
Propylene-2-cyclopentadienyl-2-(4-phenyl-1-indenyl)titanium dimethyl,
Propylene-2-cyclopentadienyl-2-(9-fluorenyl)hafnium dimethyl,
Propylene-2-cyclopentadienyl-2-(2,7-dimethoxy-9-fluorenyl)hafnium dimethyl,
Propylene-2-cyclopentadienyl-2-(2,7-di-tert-butyl-9-fluorenyl)hafnium dimethyl,
Propylene-2-cyclopentadienyl-2-(2,7-dibromo-9-fluorenyl)titanium dimethyl,
Propylene-2-cyclopentadienyl-2-(2,7-diphenyl-9-fluorenyl)hafnium dimethyl,
Propylene-2-cyclopentadienyl-2-(2,7-dimethyl-9-fluorenyl)titanium dimethyl,
Propylene-2-(3-methylcyclopentadienyl)-2-(2,7-dibutyl-9-fluorenyl)hafnium dimethyl,
Propylene-2-(3-tert-butylcyclopentadienyl)-2-(2,7-dibutyl-9-fluorenyl)titanium dimethyl,
Propylene-2-(3-trimethylsilylcyclopentadienyl)-2-(3,6-di-tert-butyl-9-fluorenyl)titanium dimethyl,
Propylene-2-cyclopentadienyl-2-[2,7-bis(3-buten-1-yl)-9-fluorenyl]hafnium dimethyl,
Propylene-2-cyclopentadienyl-2-(3-tert-butyl-9-fluorenyl)titanium dimethyl,
Propylene-2,2-bis(tetrahydroindenyl)hafnium dimethyl,
Propylene-2,2-bis(2-methylindenyl)hafnum dimethyl,
Propylene-2,2-bis(2-ethylindenyl)titanium dimethyl,
Propylene-2,2-bis(2-methyl-4,5-benzoindenyl)titanium dimethyl,
Propylene-2,2-bis(2-ethyl-4,5-benzoindenyl)hafnium dimethyl,
Propylene-2,2-bis(2-ethyl-4,5-benzoindenyl)hafnium dimethyl,
Propylene-2,2-bis(4,5-dihydro-8-methyl-7H-cyclopent[e]acenaphthylen-7-ylidene)hafnium dimethyl,
Propylene-2-(2-methyl-4,5-benzoindenyl)-2-(2-methyl-4-phenylindenyl)hafnium dimethyl,
Propylene-2-(2-ethyl-4,5-benzoindenyl)-2-(2-methyl-4-phenylindenyl)titanium dimethyl,
Propylene-2-(2-methyl-4,5-benzoindenyl)-2-(2-ethyl-4-phenylindenyl)hafnium dimethyl,
Propylene-2-(2-ethyl-4,5-benzoindenyl)-2-(2-methyl-4-naphthylindenyl)titanium dimethyl,
Propylene-2-(2-methylindenyl)-2-(4-phenylindenyl)hafnium dimethyl,
Propylene-2,2-bis(2-methyl-4-phenylindenyl)titanium dimethyl,
Propylene-2,2-bis(2-ethyl-4-phenylindenyl)hafnium dimethyl,
Propylene-2,2-bis(2-methyl-4,6-diisopropylindenyl)titanium dimethyl,
Propylene-2,2-bis(2-ethyl-4,6-diisopropylindenyl)hafnium dimethyl,
Propylene-2,2-bis(2-methyl-4-naphthylindenyl)titanium dimethyl,
Propylene-2,2-bis(2-ethyl-4-naphthylindenyl)titanium dimethyl,
1,6-Bis[methylsilylbis(2-methyl-4-phenylindenyl)hafnium dimethyl]hexane,
1,6-Bis[methylsilylbis(2-methyl-4,5-benzoindenyl)titanium dimethyl]hexane,
1,6-Bis[methylsilylbis(2-ethyl-4-phenylindenyl)hafnium dimethyl]hexane,
1,6-Bis[methylsilylbis(2-methyl-4-naphthylindenyl)titanium dimethyl]hexane,
1,6-Bis[methylsilylbis(2-methyl-4,6-diisopropylindenyl)hafnium dimethyl]hexane,
1,6-Bis[methylsilyl(2-methyl-4-phenylindenyl)(4,5-benzoindenyl)titanium dimethyl]hexane,
1-[Methylsilylbis(tetrahydroindenyl)hafnium dimethyl]-6-[ethylstannyl(cyclopentadienyl)-(fluorenyl)titanium dimethyl]hexane,
1,6-Disila-1,6,6-tetramethyl-1,6-bis[methylsilylbis(2-methyl-4-phenylindenyl)hafnium dimethyl]hexane,
1,4-Disila-1,4-bis[methylsilylbis(2-methyl-4-phenylindenyl)hafnium dimethyl]cyclohexane
[1,4-Bis(1-indenyl)-1,1,4,4-tetramethyl-1,4-disilabutane]bis(pentamethyl-cyclopentadienylhafnium dimethyl),
[1,4-Bis(9-fluorenyl)-1,1,4,4-tetramethyl-1,4-disilabutane]bis(cyclopenta-dienylhafnium dimethyl),
[1,4-Bis(1-indenyl)-1,1,4,4-tetramethyl-1,4-disilabutane]bis(cyclopenta-dienyltitanium dimethyl),
[1-(1-indenyl)-6-(2-phenyl-1-indenyl)-1,1,6,6-tetraethyl-1,6-disila-4-oxa-hexane]bis(tert-butylcyclopentadienyltitanium dimethyl),
[1,10-Bis(2,3-dimethyl-1-indenyl)-1,1,10,10-tetramethyl-1,10-digerma-decane]bis(2-methyl-4-phenylindenylhafnium dimethyl),
(1-Methyl-3-tert-butylcyclopentadienyl)(1-phenyl-4-methoxy-7-chloro-fluorenyl)titanium dimethyl,
(4,7-Dichloroindenyl)(3,6-dimesitylfluorenyl)titanium dimethyl,
Bis(2,7-di-tert-butyl-9-cyclohexylfluorenyl)hafnium dimethyl,
(2,7-Dimesitylfluorenyl)[2,7-bis(1-naphthyl)fluorenyl]hafnium dimethyl,
Dimethylsilylbis(fluorenyl)titanium dimethyl
Dibutylstannylbis(2-methylfluorenyl)hafnium dimethyl,
1,1,2,2-Tetraethyldisilanediyl(2-methylindenyl)(4-phenylfluorenyl)titanium dimethyl,
Propylene-1-(2-indenyl)-2-(9-fluorenyl)hafnium dimethyl,
1,1-Dimethyl-1-silaethylenebis(fluorenyl)titanium dimethyl,
[4-(Cyclopentadienyl)-4,7,7-trimethyl(tetrahydroindenyl)]titanium dimethyl,
[4-(Cyclopentadienyl)-4,7-dimethyl-7-phenyl(5,6-dimethyltetrahydro-indenyl)]hafnium dimethyl, [4-(Cyclopentadienyl)-4,7-dimethyl-7-(1-naphthyl)(7-phenyltetrahydro-indenyl)]titanium dimethyl,
[4-(Cyclopentadienyl)-4,7-dimethyl-7-butyl(6,6-diethyltetrahydro-indenyl)]hafnium dimethyl,
[4-(3-tert-Butylcyclopentadienyl)-4,7,7-trimethyl(tetrahydroindenyl)]hafnium dimethyl,
[4-(1-Indenyl)-4,7,7-trimethyl(tetrahydroindenyl)]titanium dimethyl,
Bis(cyclopentadienyl)zirconium dichloride,
Bis(indenyl)zirconium dichloride,
Bis(fluorenyl)zirconium dichloride,
(Indenyl)(fluorenyl)zirconium dichloride, Bis(cyclopentadienyl)titanium dichloride,
Dimethylsilanediylbis(indenyl)zirconium dichloride,
Dimethylsilanediylbis(tetrahydroindenyl)zirconium dichloride,
Dimethylsilanediylbis(cyclopentadienyl)(indenyl) zirconium dichloride,
Dimethylsilanediylbis(2-methylindenyl)zirconium dichloride,
Dimethylsilanediylbis(2-ethylindenyl)zirconium dichloride,
Dimethylsilanediylbis(2-methyl-4,5-benzoindenyl) zirconium dichloride,
Dimethylsilanediylbis(2-ethyl-4,5-benzoindenyl) zirconium dichloride,
Dimethylsilanediylbis(2-methyl-4-phenylindenyl) zirconium dichloride,
Dimethylsilanediylbis(2-ethyl-4-phenylindenyl) zirconium dichloride,
Dimethylsilanediylbis(2-methyl-4,6-diisopropylindenyl) zirconium dichloride,
Ethylene-1,2-bis(indenyl)zirconium dichloride,
Ethylene-1,2-bis(tetrahydroindenyl)zirconium dichloride,
Ethylene-1,2-bis(2-methylindenyl)zirconium dichloride,
Ethylene-1,2-bis(2-ethylindenyl)zirconium dichloride,
Ethylene-1,2-bis(2-methyl-4,5-benzoindenyl)zirconium dichloride,
Ethylene-1,2-bis(2-methyl-4-phenylindenyl)zirconium dichloride,
Ethylene-1,2-bis(2-ethyl-4-phenylindenyl)zirconium dichloride,
Ethylene-1,2-bis(2-methyl-4,6-diisopropylindenyl) zirconium dichloride,
Propylene-2,2-bis(indenyl)zirconium dichloride,
Propylene-2,2-(cyclopentadienyl)(indenyl)zirconium dichloride,
Propylene-2,2-(cyclopentadienyl)(fluorenyl)zirconium dichloride,
Bis(cyclopentadienyl)($\eta^4$-butadiene)zirconium,
Bis(methylcyclopentadienyl)($\eta^4$-butadiene)zirconium,
Bis(n-butyl-cyclopentadienyl)($\eta^4$-butadiene)zirconium,
Bisindenyl($\eta^4$-butadiene)zirconium,
(tert-butylamido)dimethyl(tetramethyl-5-cyclopentadienyl)silane($\eta^4$-butadiene)zirconium
Bis(2-methylbenzoindenyl)($\eta^4$-butadiene)zirconium,
Dimethylsilanediylbis(2-methyl-indenyl)($\eta^4$-butadiene) zirconium,
Dimethylsilanediylbisindenyl($\eta^4$-butadiene)zirconium,
Dimethylsilanediylbis(2-methyl-4,5-benzoindenyl)($\eta^4$-butadiene)zirconium,
Dimethylsilanediyl(2-methyl-4,5-benzoindenyl)(2-methyl-indenyl)($\eta^4$-butadiene)zirconium,
Dimethylsilanediyl(2-methyl-4,5-benzoindenyl)(2-methyl-4-phenylindenyl)($\eta^4$-butadiene)zirconium,
Dimethylsilanediyl(2-methylindenyl)(4-phenylindenyl) ($\eta^4$-butadiene)zirconium,
Dimethylsilanediylbis(2-methyl-4-phenyl-indenyl)($\eta^4$-butadiene)zirconium,
Dimethylsilanediylbis(2-methyl-4,6-diisopropyl-indenyl) ($\eta^4$-butadiene)zirconium,
Dimethylsilanediylbis(2-methyl-4,5-diisopropyl-indenyl) ($\eta^4$-butadiene)zirconium,
Dimethylsilanediylbis(2-ethyl-4-naphthyl-indenyl)($\eta^4$-butadiene)zirconium,
Dimethylsilanediyl(3-t-butylcyclopentadienyl) (fluorenyl)-($\eta^4$-butadiene)zirconium,
Dimethylsilanediylbis(2-ethyl-4-phenylindenyl)($\eta^4$-butadiene)zirconium,
Dimethylsilanediylbis(2,3,4-trimethylindenyl)($\eta^4$-butadiene)zirconium,
Dimethylsilanediylbis(2,4-dimethylindenyl)($\eta^4$-butadiene)zirconium,
Dimethylsilanediylbis(2,4,7-trimethylindenyl)($\eta^4$-butadiene)zirconium,
Dimethylsilanediylbis(4,5-dihydro-8-methyl-7H-cyclopent[e]acenaphthylen-7-ylidene)($\eta^4$-butadiene) zirconium,
Isopropylidene(cyclopentadienyl)(fluorenyl)($\eta^4$-butadiene)zirconium,
Isopropylidene(3-methylcyclopentadienyl)(fluorenyl) ($\eta^4$-butadiene)zirconium,
Isopropylidene(cyclopentadienyl)(indenyl)($\eta^4$-butadiene)zirconium,
Ethylene-1,2-bis(2-methyl-indenyl)($\eta^4$-butadiene) zirconium,
Ethylene-1,2-bisindenyl($\eta^4$-butadiene)zirconium,
Ethylene-1,2-bis(2-methyl-4,5-benzoindenyl)($\eta^4$-butadiene)zirconium,
Ethylene-1,2-bis(2-methyl-4-phenyl-indenyl)($\eta^4$-butadiene)zirconium,
Ethylene-1,2-bis(2-methyl-4,6-diisopropyl-indenyl)($\eta^4$-butadiene)zirconium,
Ethylene-1,2-bis(2-methyl-4,5-diisopropyl-indenyl)($\eta^4$-butadiene)zirconium,
Ethylene-1,2-bis(2-ethyl-4-naphthyl-indenyl)($\eta^4$-butadiene)zirconium,
Ethylene-1,2-(3-t-butylcyclopentadienyl)(fluorenyl)($\eta^4$-butadiene)zirconium,
Ethylene-1,2-bis(2-ethyl-4-phenylindenyl)($\eta^4$-butadiene) zirconium,
Ethylene-1,2-bis(2,3,4-trimethylindenyl)($\eta^4$-butadiene) zirconium,
Ethylene-1,2-bis(2,4-dimethylindenyl)($\eta^4$-butadiene) zirconium,
Ethylene-1,2-bis(2,4,7-trimethylindenyl)($\eta^4$-butadiene) zirconium,
(2-methyl-4,5-benzoindenyl)(2-methyl-ndenyl)($\eta^4$-butadiene)zirconium,
Ethlylene-2,2-bis(2-methyl-4-phenyl-indenyl)($\eta^4$-butadiene)zirconium,
Propylene-2,2-bis(2-methyl-4,6-diisopropyl-indenyl) ($\eta^4$-butadiene)zirconium,
Propylene-2,2-bis(2-ethyl-4-naphthyl-indenyl)($\eta^4$-butadien)zirconium,
Propylene-2,2-(3-t-butylcyclopentadienyl)(fluorenyl) ($\eta^4$-butadiene)zirconium,
Propylene-2,2-bis(2-ethyl-4-phenylindenyl)($\eta^4$-butadiene)zirconium,
Propylene-2,2-bis(2,4-dimethylindenyl)($\eta^4$-butadiene) zirconium,
Propylene-2,2-bis(2-methyl-indenyl)($\eta^4$-butadiene) zirconium,
Propylene-2,2-bisindenyl($\eta^4$-butadiene)zirconium, Propylene-2,2-bis(2-methyl-4,5-benzoindenyl)($\eta^4$-butadiene)zirconium,
Diphenylsilanediylbis(2-methyl-indenyl)($\eta^4$-butadiene)zirconium,
Diphenylsilanediylbisindenyl($\eta^4$-butadiene)zirconium,
Diphenylsilanediylbis(2-methyl-4,5-benzoindenyl)($\eta^4$-butadiene)zirconium,
Diphenylsilanediyl(2-methyl-4,5-benzoindenyl)(2-methyl-indenyl)($\eta^4$-butadiene)zirconium,
Diphenylsilanediyl(2-methyl-4,5-benzoindenyl)(2-methyl-4-phenylindenyl) ($\eta^4$-butadiene)zirconium,
Diphenylsilanediylbis(2-methyl-4-phenyl-indenyl)($\eta^4$-butadiene)zirconium,
Diphenylsilanediylbis(2-methyl-4,6-diisopropyl-indenyl) ($\eta^4$-butadiene)zirconium,
Diphenylsilanediylbis(2-methyl-4,5-diisopropyl-indenyl) ($\eta^4$-butadiene)zirconium,
Diphenylsilanediylbis(2-ethyl-4-naphthyl-indenyl)($\eta^4$-butadiene)zirconium,
Diphenylsilanediyl(3-t-butylcyclopentadienyl)(fluorenyl) ($\eta^4$-butadiene)-zirconium,
Diphenylsilanediylbis(2-ethyl-4-phenylindenyl)($\eta^4$-butadiene)zirconium,
Diphenylsilanediylbis(2,4-dimethylindenyl)($\eta^4$-butadiene)zirconium,
Diphenylsilanediylbis(2,4,7-trimethylindenyl)($\eta^4$-butadiene)zirconium,
Diphenylsilanediyl-(3-(trimethylsilyl)cyclopentadienyl) (fluorenyl)($\eta^4$-buta-diene)zirconium,
Diphenylsilanediylbis(4,5-dihydro-8-methyl-7H-cyclopent[e]acenaphthylen-7-ylidene)($\eta^4$-butadiene) zirconium,
Phenylmethylsilanediylbis(2-methyl-indenyl)($\eta^4$-butadiene)zirconium,
Phenylmethylsilanediylbisindenyl($\eta^4$-butadiene) zirconium,
Phenylmethylsilanediylbis(2-methyl-4,5-benzoindenyl) ($\eta^4$-butadiene)-zirconium,
Phenylmethylsilanediyl(2-methyl-4,5-benzoindenyl)(2-methyl-indenyl) ($\eta^4$-butadiene)zirconium,
Phenylmethylsilanediyl(2-methyl-4,5-benzoindenyl)(2-methyl-4-phenyl-indenyl)($\eta^4$-butadiene)zirconium,
Phenylmethylsilanediyl(2-methylindenyl)(4-phenylindenyl)($\eta^4$-butadiene)-zirconium,
Phenylmethylsilanediylbis(2-methyl-4-phenyl-indenyl) ($\eta^4$-butadiene)-zirconium,
Phenylmethylsilanediylbis(2-ethyl-4-phenyl-indenyl)($\eta^4$-butadiene)-zirconium,
Phenylmethylsilanedlylbis(2-methyl-4,6-diisopropyl-indenyl)($\eta^4$-buta-diene)zirconium,
Phenylmethylsilanediylbis(2-methyl-4-naphthyl-indenyl) ($\eta^4$-butadiene)-zirconium,
1,6-{Bis[methylsilyl-bis(2-methyl-4-phenyl-indenyl)($\eta^4$-butadiene)-zirconium]}hexane,
1,6-{Bis[methylsilyl-bis(2-ethyl-4-phenyl-indenyl)($\eta^4$-butadiene)-zirconium]}hexane,
1,6-{Bis[methylsilyl-bis(2-methyl-4-naphthyl-indenyl) ($\eta^4$-butadiene)-zirconium]}hexane,
1,6-{Bis[methylsilyl-bis(2-methyl-4,5-benzoindenyl)($\eta^4$-butadiene)-zirconium]}hexane,
1,6-{Bis[methylsilyl-(2-methyl-4-phenyl-indenyl)(2-methyl-indenyl)($\eta^4$-butadiene)zirconium]}hexane,
1,2-{Bis[methylsilyl-bis(2-methyl-4-phenyl-indenyl)($\eta^4$-butadiene)-zirconium]}ethane,
1,2-{Bis[methylsilyl-bis(2-ethyl-4-phenyl-indenyl)($\eta^4$-butadiene)-zirconium]}ethane,
1,2-{Bis[methylsilyl-bis(2-methyl-4-naphthyl-indenyl) ($\eta^4$-butadiene)-zirconium]}ethane,
1,2-{Bis[methylsiyl-bis(2-methyl-4,5-benzoindenyl)($\eta^4$-butadiene)-zirconium]}ethane,
1,2-{Bis[methylsilyl-(2-methyl-4-phenyl-indenyl)(2-methyl-indenyl)($\eta^4$-butadiene)zirconium]}ethane,
Methylphenylmethylene(fluorenyl)(cyclopentadienyl) ($\eta^4$-butadiene)-zirconium,
Diphenylmethylene(fluorenyl)(cyclopentadienyl)($\eta^4$-butadiene)zirconium,
4-Cyclopentadienyl-4,7,7-trimethyltetrahydroindenylzirconium dimethyl,
Dimethylsilanediyl(tert-butylamido) (tetramethylcyclopentadienyl)zirconium dimethyl,
Dimethylsilanediyl(tert-butylamido)(cyclopentadienyl) zirconium dimethyl,
Dimethylsilanediyl(tert-butylamido)(indenyl)zirconium dimethyl,
Dimethylsilanediyl(tert-butylamido)(indenyl)titanium dimethyl,
Dimethylsilanediyl(cyclohexylamido) (methylcyclopentadienyl)zirconium dimethyl and
Dimethylsilanediyl(cyclohexylamido) (methylcyclopentadienyl)titanium dimethyl.

6. A supported catalyst composition as claimed in claim 1, wherein said at least one metallocene is a non-bridged or bridged metallocene of the formula I

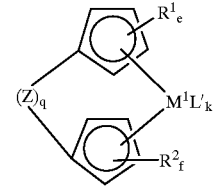

in which
M$^1$ is a metal of group 3, 4, 5 or 6 of the Periodic Table of the Elements,
R$^1$ is identical or different at each occurrence and is a hydrogen atom or SiR$^3{}_3$, in which each R$^3$ is identical or different and is a hydrogen atom or a C$_1$–C$_{40}$ carbon-containing group, or two or more radicals R$^1$ are joined to one another such that the radicals R$^1$ and the atoms of the cyclopentadienyl ring which link them form a C$_4$–C$_{24}$ ring system which is also optionally substituted,
R$^2$ is identical or different at each occurrence and is a hydrogen atom, SiR$_3{}^3$, in which each R$^3$ is defined above or two or more radicals R$^2$ are joined to one another such that the radicals R$^2$ and the atoms of the cyclopentadienyl ring which link them form a C$_4$–C$_{24}$ ring system which is also optionally substituted,
q is 0 or 1,
e is 5 if q=0, and is 4 if q=1,
f is 5 if q=0, and is 4 if q=1,
L' is identical or different at each occurrence and is a halogen atom or a carbon-containing radical having 1–20 carbon atoms, k is an integer from 1 to 4, and Z is a bridging structural element between the two cyclopentadienyl rings.

7. The supported catalyst composition as claimed in claim 6, wherein $M^1$ is zirconium or hafnium, each $R^3$ is identical or different and is a hydrogen atom, $C_1$–$C_{25}$-alkyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, Z is $M^2R^4R^5$, in which $M^2$ is carbon, silicon, germanium or tin and $R^4$ and $R^5$ are identical or different and are a $C_1$–$C_{20}$ carbon-containing group.

8. A process for preparing a supported catalyst composition as claimed in claim 1, which comprises mixing at least one said support with at least one said metallocene and with at least one said cocatalyst.

9. The process as claimed in claim 8, wherein all the metallocene and the cocatalyst are mixed with one another to form a resulting cationic metallocene complex and then the resulting cationic metallocene complex is mixed with the support.

10. The supported catalyst composition as claimed in claim 1, wherein $R^6$ is a $C_1$–$C_{40}$-hydrocarbon radical which can be halogenated or perhalogenated with halogens, X is a $C_6$–$C_{30}$-arylene group, a $C_2$–$C_{30}$-alkenylene group or a $C_2$–$C_{30}$-alkynylene group which is halogenated or perhalogenated, j is 2 or 3 a, b and c are identical or different and are 0, 1 or 2, g is 0 or 1, and

A is a carbonium ion ($R_3C^+$) or quaternary ammonium ion having an acidic H function ($R_3NH^+$).

11. The supported catalyst composition as claimed in claim 1, wherein $M^3$ is boron, and A is a quaternary ammonium salt having an acidic H functional group.

12. The supported catalyst composition as claimed in claim 1, wherein the support material, before being brought into contact with the metallocene and the cocatalyst, is reacted with an organoaluminum, organoboron, organomagnesium or organosilicon compound.

13. A process for preparing a polyolefin, which comprises polymerizing an olefin in the presence of the catalyst composition as claimed in claim 1.

* * * * *

UNITED STATES PATENT AND TRADEMARK OFFICE
CERTIFICATE OF CORRECTION

PATENT NO. : 6,124,231
DATED : September 26, 2000
INVENTOR(S) : Fritze et al.

It is certified that error appears in the above-identified patent and that said Letters Patent is hereby corrected as shown below:

Column 36,
Line 34, "cyclopenten[e]acenaphthylen-7-....." should read as
-- ...cyclopent[e]acenaphthylen-7-..... --
Lines 36 and 37, "Dimethylsilanediylbis(2-ethyl-4,5-benzoindenyl)(2-ethyl-4-phenylindenyl)-zirconium dimethyl," should read as -- Dimethylsilanediyl(2-methyl-4,5-benzoindenyl)(2-methyl-4-phenylindenyl)-zirconium dimethyl, --
Line 37 prior to line 38 please add the line -- Dimethylsilanediyl(2-ethyl-4,5-benzoindenyl)(2-methyl-4-phenylindenyl)-zirconium dimethyl, --

Column 40,
Line 2, please insert a return between the two species "zirconiumdimethyl" and "1-Silacyclopentane-1,1-bis(2-"

Column 42,
Line 63, "Dimethylsilanediylbis(4,5-...." should read as
-- Methylphenylsilanediylbis(4,5... --.

Column 43,
Line 1, "Methylphenylsilanediyl(2-methyl-4,5-....." should read as
-- Methylphenylsilanediyl(2-ethyl-4,5-..... --
Lines 5 and 6, "Methylphenylsilanediyl(2-methyl-4,5-benzoindenyl)(2-methyl-4-...." should read as -- Methylphenylsilanediyl(2-ethyl-4,5-benzoindenyl)(2-ethyl-4... --

Column 44,
Line 13, "dim ethyl" should read as -- dimethyl --

Column 45,
Lines 38-39, please delete "Propylene-2,2-bis(2-ethyl-4,5-benzoindenyl)hafnium dimethyl,"

Column 46,
Line 54, please insert a return between the two species "dimethyl," and "[4-".

UNITED STATES PATENT AND TRADEMARK OFFICE
CERTIFICATE OF CORRECTION

PATENT NO.   : 6,124,231
DATED        : September 26, 2000
INVENTOR(S)  : Fritze et al.

It is certified that error appears in the above-identified patent and that said Letters Patent is hereby corrected as shown below:

Column 48,
After line 48 and prior to line 49, please insert -- Ethylene-1,2-bis(4,5-dihydro-8-methyl-7H-cyclopent[e]acenaphthylen-7-ylidene)($\eta^4$-butadiene) zirconium, --
Line 49, please delete "2-methyl-4,5-benzoindenyl)(2-methyl-ndenyl)($\eta^4$-" and insert -- 2-methyl-4,5-benzoindenyl)(2-methyl-indenyl)($\eta^4$- --.
Line 52, "Ethlylene" should read as -- Propylene --.

Signed and Sealed this

First Day of January, 2002

Attest:

JAMES E. ROGAN
Attesting Officer         Director of the United States Patent and Trademark Office